US012100406B2

(12) United States Patent
Wang

(10) Patent No.: US 12,100,406 B2
(45) Date of Patent: Sep. 24, 2024

(54) METHOD, APPARATUS, AND SYSTEM FOR PROCESSING AUDIO DATA

(71) Applicant: Huawei Technologies Co., Ltd., Shenzhen (CN)

(72) Inventor: Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/344,445

(22) Filed: Jun. 29, 2023

(65) Prior Publication Data

US 2023/0352035 A1 Nov. 2, 2023

Related U.S. Application Data

(63) Continuation of application No. 17/507,200, filed on Oct. 21, 2021, now Pat. No. 11,727,946, which is a
(Continued)

(30) Foreign Application Priority Data

Dec. 30, 2011 (CN) ........................ 201110455836.7

(51) Int. Cl.
*G10L 19/012* (2013.01)
*G10L 19/02* (2013.01)
(Continued)

(52) U.S. Cl.
CPC ........ *G10L 19/012* (2013.01); *G10L 19/0204* (2013.01); *G10L 19/22* (2013.01);
(Continued)

(58) Field of Classification Search
CPC ... G10L 19/012; G10L 19/18; G10L 19/0208; G10L 19/12; G10L 21/0264;
(Continued)

(56) References Cited

U.S. PATENT DOCUMENTS 6,424,938 B1 7/2002 Johansson et al.
6,522,746 B1 2/2003 Marchok et al.
(Continued)

FOREIGN PATENT DOCUMENTS

CN 101087319 A 12/2007
CN 101246688 A 8/2008
(Continued)

OTHER PUBLICATIONS

"Series G: Transmission Systems and Media, Digital Systems and Networks, Digital terminal equipments —Coding of voice and audio signals, Frame error robust narrow-band and wideband embedded variable bit-rate coding of speech and audio from 8-32 kbit/s," ITU-T, G.718, Jun. 2008, 267 pages.
(Continued)

*Primary Examiner* — Vijay B Chawan
(74) *Attorney, Agent, or Firm* — Conley Rose, P.C.

(57) ABSTRACT

A method for processing an audio signal includes receiving a bitstream corresponding to the audio signal; obtaining a silence insertion descriptor (SID) type of a current frame of the audio signal by decoding the bitstream; obtaining a low-band parameter of the current frame by decoding the bitstream; obtaining a low-band signal of the current frame based on the low-band parameter; obtaining, based on the SID type of the current frame, a high-band parameter of the current frame; obtaining a high-band signal of the current frame based on the high-band parameter; and obtaining a synthesis signal of the current frame based on the low-band signal and the high-band signal.

20 Claims, 7 Drawing Sheets

Related U.S. Application Data continuation of application No. 16/697,822, filed on Nov. 27, 2019, now Pat. No. 11,183,197, which is a continuation of application No. 15/867,977, filed on Jan. 11, 2018, now Pat. No. 10,529,345, which is a continuation of application No. 15/188,518, filed on Jun. 21, 2016, now Pat. No. 9,892,738, which is a continuation of application No. 14/318,899, filed on Jun. 30, 2014, now Pat. No. 9,406,304, which is a continuation of application No. PCT/CN2012/087812, filed on Dec. 28, 2012.

(51) Int. Cl.

| | |
|---|---|
| ***G10L 19/22*** | (2013.01) |
| ***G10L 19/26*** | (2013.01) |
| ***G10L 25/21*** | (2013.01) |
| ***G10L 25/78*** | (2013.01) |
| *G10L 19/18* | (2013.01) |

(52) U.S. Cl.

CPC ............ *G10L 19/265* (2013.01); *G10L 25/21* (2013.01); *G10L 25/78* (2013.01); *G10L 19/18* (2013.01)

(58) Field of Classification Search

CPC . G10L 21/0208; G10L 19/20; G10L 19/0204; G10L 19/22; G10L 19/265; G10L 21/0364

See application file for complete search history.

(56) References Cited

U.S. PATENT DOCUMENTS

| | | | | |
|---|---|---|---|---|
| 6,549,587 | B1 | 4/2003 | Li | |
| 6,615,169 | B1 | 9/2003 | Ojala et al. | |
| 6,691,085 | B1 | 2/2004 | Rotola-Pukkila et al. | |
| 6,810,273 | B1 | 10/2004 | Mattila et al. | |
| 7,171,246 | B2 | 1/2007 | Mattila et al. | |
| 7,236,586 | B2 | 6/2007 | Marchok et al. | |
| 7,319,703 | B2 | 1/2008 | Lakaniemi et al. | |
| 7,500,018 | B2 | 3/2009 | Hakansson et al. | |
| 7,912,712 | B2 * | 3/2011 | Shlomot | G10L 19/012 704/214 |
| 8,032,359 | B2 | 10/2011 | Shlomot et al. | |
| 8,224,657 | B2 | 7/2012 | Jelinek et al. | |
| 8,370,135 | B2 * | 2/2013 | Shlomot | G10L 19/012 704/226 |
| 8,494,846 | B2 | 7/2013 | Dai et al. | |
| 8,949,121 | B2 | 2/2015 | Schandl et al. | |
| 9,047,877 | B2 | 6/2015 | Dai et al. | |
| 9,406,304 | B2 * | 8/2016 | Wang | G10L 25/78 |
| 9,583,114 | B2 | 2/2017 | Lombard et al. | |
| 9,892,738 | B2 * | 2/2018 | Wang | G10L 25/78 |
| 10,529,345 | B2 * | 1/2020 | Wang | G10L 19/0204 |
| 11,183,197 | B2 * | 11/2021 | Wang | G10L 19/265 |
| 11,727,946 | B2 * | 8/2023 | Wang | G10L 25/21 704/226 |
| 2003/0091182 | A1 | 5/2003 | Marchok et al. | |
| 2003/0093270 | A1 | 5/2003 | Domer | |
| 2004/0062274 | A1 * | 4/2004 | Hakansson | H04J 3/17 370/468 |
| 2004/0260545 | A1 | 12/2004 | Gao et al. | |
| 2006/0247926 | A1 | 11/2006 | Rousseau | |
| 2007/0109995 | A1 | 5/2007 | Quigley et al. | |
| 2008/0027716 | A1 | 1/2008 | Rajendran et al. | |
| 2008/0027717 | A1 | 1/2008 | Rajendran et al. | |
| 2008/0195383 | A1 | 8/2008 | Shlomot et al. | |
| 2008/0267424 | A1 | 10/2008 | Mori et al. | |
| 2009/0103573 | A1 | 4/2009 | Leblanc et al. | |
| 2010/0042416 | A1 | 2/2010 | Wan et al. | |
| 2010/0228557 | A1 | 9/2010 | Chen et al. | |
| 2010/0268531 | A1 * | 10/2010 | Dai | G10L 25/78 704/E11.007 |
| 2010/0280823 | A1 | 11/2010 | Shlomot et al. | |
| 2010/0318352 | A1 | 12/2010 | Taddei et al. | |
| 2011/0004471 | A1 * | 1/2011 | Schandl | G10L 19/012 704/226 |
| 2011/0010167 | A1 * | 1/2011 | Dai | G10L 19/012 704/201 |
| 2011/0228946 | A1 | 9/2011 | Chen et al. | |
| 2011/0320194 | A1 | 12/2011 | Shlomot et al. | |
| 2013/0138433 | A1 | 5/2013 | Suihko et al. | |
| 2015/0287415 | A1 * | 10/2015 | Lombard | G10L 19/002 704/500 |
| 2022/0044692 | A1 * | 2/2022 | Wang | G10L 19/265 |
| 2023/0352035 | A1 * | 11/2023 | Wang | G10L 19/012 |

FOREIGN PATENT DOCUMENTS

| | | | |
|---|---|---|---|
| CN | 101320563 | A | 12/2008 |
| JP | 2004537739 | A | 12/2004 |
| JP | 2008139447 | A | 6/2008 |
| JP | 2009545778 | A | 12/2009 |
| JP | 2009545779 | A | 12/2009 |
| JP | 2010518453 | A | 5/2010 |
| JP | 2011502287 | A | 1/2011 |
| JP | 2011514561 | A | 5/2011 |
| JP | 2012215198 | A | 11/2012 |
| KR | 20100120217 | A | 11/2010 |
| RU | 2251750 | C2 | 5/2005 |
| RU | 2262748 | C2 | 10/2005 |

OTHER PUBLICATIONS

"Series G: Transmission Systems and Media, Digital Systems and Networks, Digital terminal equipments—Coding of analogue signals by methods other than PCM, G.729-based embedded variable bit-rate coder: An 8-32 kbit/s scalable wideband coder bitstream interoperable with G.729, Amendment 4: New Annex C (DTX/CNG scheme) plus corrections to main body and Annex B," ITU-T, G.729.1, Amendment 4, Jun. 2008, 128 pages.

* cited by examiner

METHOD, APPARATUS, AND SYSTEM FOR PROCESSING AUDIO DATA

CROSS-REFERENCE TO RELATED APPLICATIONS

This application is a continuation application of U.S. patent application Ser. No. 17/507,200, filed on Oct. 21, 2021, which is a continuation application of U.S. patent application Ser. No. 16/697,822, filed on Nov. 27, 2019, now U.S. Pat. No. 11,183,197, which is a continuation application of U.S. patent application Ser. No. 15/867,977, filed on Jan. 11, 2018, now U.S. Pat. No. 10,529,345, which is a continuation application of U.S. patent application Ser. No. 15/188,518, filed on Jun. 21, 2016, now U.S. Pat. No. 9,892,738, which is a continuation application of U.S. patent application Ser. No. 14/318,899, filed on Jun. 30, 2014, now U.S. Pat. No. 9,406,304, which is a continuation application of International Patent Application No. PCT/CN2012/087812, filed on Dec. 28, 2012, which claims priority to Chinese Patent Application No. 201110455836.7, filed on Dec. 30, 2011. All of the aforementioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of communications technologies, and in particular, to a method, an apparatus, and a system for processing audio data.

BACKGROUND

In the field of digital communications, there are extensive application requirements for transmission of speeches, images, audios, and videos, such as mobile phone calls, audio/video conferencing, broadcast television, and multimedia entertainment. A speech is digitized, and then transferred from one terminal to another terminal through a voice communication network. Herein the terminals may be mobile phones, digital phone terminals, or voice terminals or any other types. Examples of digital phone terminals are Voice over Internet Protocol (VOIP) phones or Integrated Services Digital Network (ISDN) phones, computers, and cable communication phones. To reduce resources occupied in the process of storing or transmitting audio signals, a sending end performs compression processing on audio signals before transmitting the audio signals to a receiving end, and the receiving end performs decompression processing to restore the audio signals and play the audio signals.

In voice communication, speech is included in only about 40% of the time, and at other times, there is only silence or background noise. To save transmission bandwidths and avoid unnecessary consumption of bandwidths in a silence or background noise period, a Discontinuous transmission system/Comfort Noise Generation (DTX/CNG) technology emerges. Simply, DTX/CNG means not encoding noise frames continuously, but performing encoding only once at an interval of several frames in a noise/silence period according to a policy, where an encoded bit rate is generally much lower than a bit rate of speech frame encoding. A noise frame encoded at such a low rate is referred to as a Silence Insertion Descriptor frame (SID). A decoder restores continuous background noise frames at the decoding end according to discontinuously received SIDs. Such continuously restored background noise is not a faithful reproduction of background noise of an encoding end, but aims to avoid causing quality deterioration in hearing as much as possible, so that a user feels comfortable when hearing the noise. The restored background noise is referred to as Comfort Noise (CN), and the method for restoring the CN at the decoding end is referred to as comfort noise generation.

International Telecommunications Union Telecommunication Standardization Sector (ITU-T) G.718 is a new standard wideband codec, which includes a wideband DTX/CNG system. The system may send an SID according to a fixed interval, and may also adaptively adjust the SID sending interval according to an estimated noise level. An SID frame of G.718 includes 16 immittance spectral pair (ISP) parameters and excitation energy parameters. This group of ISP parameters represents a spectral envelope on the bandwidth of an entire wide band, and an excitation energy is obtained by an analysis filter represented by this group of ISP parameters. At the decoding end, the G.718 estimates, according to ISP parameters obtained by decoding an SID in a CNG state, a linear prediction coefficient (LPC) required for CNG, estimates, according to excitation energy parameters obtained by decoding the SID frame, an excitation energy required for CNG, and uses gain-adjusted white noise to excite a CNG synthesis filter to obtain a reconstructed CN.

However, for a super-wideband spectral envelope, the bandwidth of the super wide band is extremely wide, in a super-wideband DTX/CNG system, more calculation loads and bits need to be consumed to calculate and encode the added dozen of ISP parameters, because a complete super-wideband spectral envelope needs to be encoded for an SID. Because high-band signals of noise (which refers to a frequency range above the wide band herein) are generally not perceptually sensitive in hearing, calculation loads and bits consumed for this part of signals are not cost-effective, thereby reducing the encoding efficiency of the codec.

SUMMARY

To solve a super-wideband encoding and transmission problem, embodiments of the present disclosure provide a method, an apparatus, and a system for processing audio data. The technical solutions are as follows.

According to one aspect, a method for processing audio data is provided and includes: obtaining a noise frame of an audio signal; decomposing the noise frame into a noise low-band signal and a noise high-band signal; and encoding the noise low-band signal using a first discontinuous transmission mechanism; transmitting the encoded noise low-band signal using the first discontinuous transmission mechanism; encoding the noise high-band signal using a second discontinuous transmission mechanism; and transmitting the encoded noise high-band signal using the second discontinuous transmission mechanism, where a policy for sending a first SID of the first discontinuous transmission mechanism is different from a policy for sending a second SID of the second discontinuous transmission mechanism, or where a policy for encoding a first SID of the first discontinuous transmission mechanism is different from a policy for encoding a second SID of the second discontinuous transmission mechanism.

According to one aspect, a method for processing audio data is provided and includes: obtaining, by a decoder, an SID; determining whether the SID includes a low-band parameter and/or a high-band parameter; when the SID includes the low-band parameter, decoding the SID to obtain a noise low-band parameter, locally generating a noise high-band parameter, and obtaining a first CN frame according to the noise low-band parameter obtained by decoding and the locally generated noise high-band parameter; when the SID includes the high-band parameter, decoding the SID to obtain a noise high-band parameter, locally generating a noise low-band parameter, and obtaining a second CN frame according to the noise high-band parameter obtained by decoding and the locally generated noise low-band parameter; and when the SID includes the high-band parameter and the low-band parameter, decoding the SID to obtain a noise high-band parameter and a noise low-band parameter, and obtaining a third CN frame according to the noise high-band parameter and the noise low-band parameter obtained by decoding.

According to another aspect, an apparatus for encoding audio data is provided and includes: an obtaining module configured to obtain a noise frame of an audio signal, and decompose the noise frame into a noise low-band signal and a noise high-band signal; and a transmitting module configured to encode the noise low-band signal using a first discontinuous transmission mechanism and transmit the encoded noise low-band signal using the first discontinuous transmission mechanism. The transmitting module is further configured to encode the noise high-band signal using a second discontinuous transmission mechanism and transmit the encoded noise high-band signal using the second discontinuous transmission mechanism, where a policy for sending a first SID of the first discontinuous transmission mechanism is different from a policy for sending a second SID of the second discontinuous transmission mechanism, or where a policy for encoding a first SID of the first discontinuous transmission mechanism is different from a policy for encoding a second SID of the second discontinuous transmission mechanism.

According to another aspect, an apparatus for decoding audio data is provided and includes: an obtaining module configured to obtain an SID, and determine whether the SID includes a low-band parameter and/or a high-band parameter; a first decoding module configured to, when the SID obtained by the obtaining module includes the low-band parameter, decode the SID to obtain a noise low-band parameter, locally generate a noise high-band parameter, and obtain a first CN frame according to the noise low-band parameter obtained by decoding and the locally generated noise high-band parameter; a second decoding module configured to, when the SID obtained by the obtaining module includes the high-band parameter, decode the SID to obtain a noise high-band parameter, locally generate a noise low-band parameter, and obtain a second CN frame according to the noise high-band parameter obtained by decoding and the locally generated noise low-band parameter; and a third decoding module configured to, when the SID obtained by the obtaining module includes the high-band parameter and the low-band parameter, decode the SID to obtain a noise high-band parameter and a noise low-band parameter, and obtain a third CN frame according to the noise high-band parameter and the noise low-band parameter obtained by decoding.

According to another aspect, a system for processing audio data is provided and includes the foregoing apparatus for encoding audio data and the foregoing apparatus for decoding audio data.

The technical solutions provided by the embodiments of the present disclosure bring the following beneficial effects. A current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. Additionally, a decoder obtains an SID, and determines whether the SID includes a low-band parameter and/or a high-band parameter, and different noise decoding manners are used according to different determining results. In this way, different encoding and decoding processing manners are used for the high-band signal and the low-band signal, calculation complexity may be reduced and encoded bits may be saved under a premise of not lowering subjective quality of a codec, and bits that are saved may help to achieve an objective of reducing a transmission bandwidth or improving overall encoding quality, thereby solving a super-wideband encoding and transmission problem.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the embodiments of the present disclosure in detail with reference to the accompanying drawings.

Embodiment 1

Figure 1:
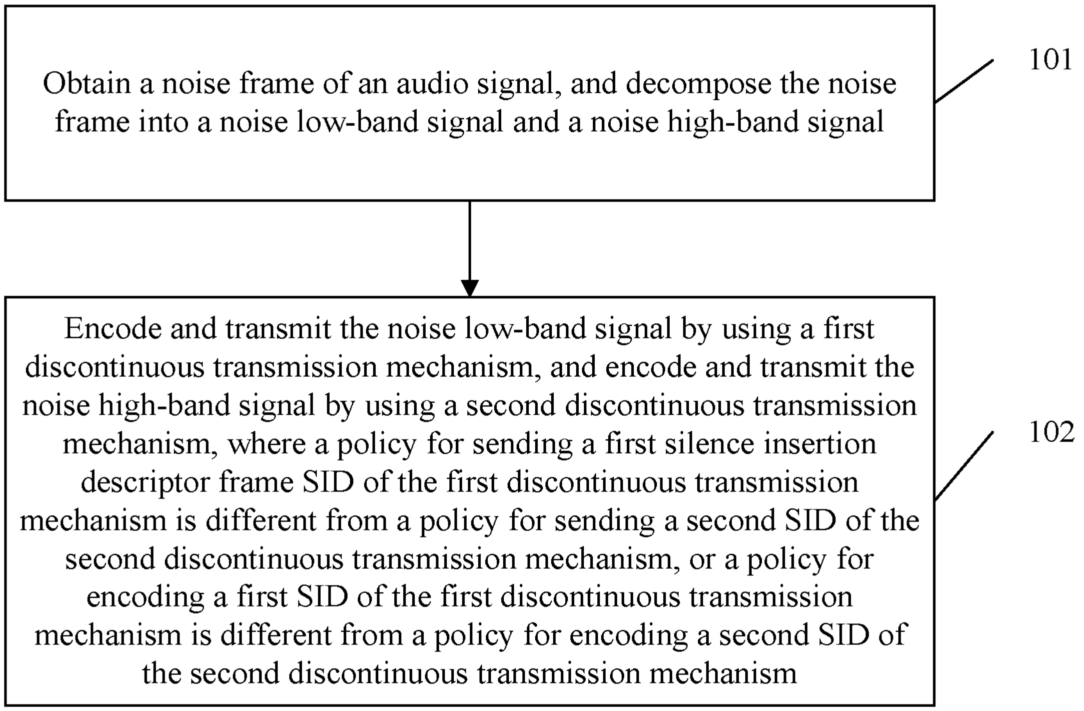
FIG. 1 is a flowchart of a method for processing audio data according to Embodiment 1 of the present disclosure.

Referring to FIG. 1, this embodiment provides a method for processing audio data, where the method includes the following steps.

101. Obtain a noise frame of an audio signal, and decompose the noise frame into a noise low-band signal and a noise high-band signal.

102. Encode and transmit the noise low-band signal using a first discontinuous transmission mechanism, and encode and transmit the noise high-band signal using a second discontinuous transmission mechanism, where a policy for sending a first SID of the first discontinuous transmission mechanism is different from a policy for sending a second SID of the second discontinuous transmission mechanism, or where a policy for encoding a first SID of the first discontinuous transmission mechanism is different from a policy for encoding a second SID of the second discontinuous transmission mechanism.

In this embodiment, the first SID includes a low-band parameter of the noise frame, and the second SID includes a low-band parameter or a high-band parameter of the noise frame.

Optionally, in this embodiment, the encoding and transmitting the noise high-band signal using a second discontinuous transmission mechanism includes: determining whether the noise high-band signal has a preset spectral structure, if yes, and a sending condition of the policy for sending the second SID is satisfied, encoding an SID of the noise high-band signal using the policy for encoding the second SID, and sending the SID; and if not, determining that the noise high-band signal does not need to be encoded and transmitted.

The determining whether the noise high-band signal has a preset spectral structure includes: obtaining a spectrum of the noise high-band signal; dividing the spectrum into at least two sub-bands; and if an average energy of any first sub-band in the sub-bands is not smaller than an average energy of a second sub-band in the sub-bands, where a frequency band in which the second sub-band is located is higher than a frequency band in which the first sub-band is located, determining that the noise high-band signal has no preset spectral structure; otherwise, determining that the noise high-band signal has a preset spectral structure.

Optionally, in this embodiment, the encoding and transmitting the noise high-band signal using a second discontinuous transmission mechanism includes: generating a deviation according to a first ratio and a second ratio, where the first ratio is a ratio of an energy of the noise high-band signal to an energy of the noise low-band signal of the noise frame, and where the second ratio is a ratio of an energy of a noise high-band signal to an energy of a noise low-band signal at a moment when an SID including a noise high-band parameter is sent last time before the noise frame; and determining whether the deviation reaches a preset threshold, if yes, encoding an SID of the noise high-band signal using the policy for encoding the second SID, and sending the SID, and if not, determining that the noise high-band signal does not need to be encoded and transmitted.

Optionally, that the first ratio is a ratio of an energy of the noise high-band signal to an energy of the noise low-band signal of the noise frame includes that the first ratio is a ratio of an instant energy of the noise high-band signal to an instant energy of the noise low-band signal of the noise frame. Correspondingly, that the second ratio is a ratio of an energy of a noise high-band signal to an energy of a noise low-band signal at a moment when an SID including a noise high-band parameter is sent last time before the noise frame includes that the second ratio is a ratio of an instant energy of the noise high-band signal to an instant energy of the noise low-band signal at the moment when the SID including the noise high-band parameter is sent last time before the noise frame.

Alternatively, that the first ratio is a ratio of an energy of the noise high-band signal to an energy of the noise low-band signal of the noise frame includes that the first ratio is a ratio of a weighted average energy of noise high-band signals of the noise frame and a noise frame prior to the noise frame to a weighted average energy of noise low-band signals of the noise frame and the noise frame prior to the noise frame. Correspondingly, that the second ratio is a ratio of an energy of a noise high-band signal to an energy of a noise low-band signal at a moment when an SID including a noise high-band parameter is sent last time before the noise frame includes that the second ratio is a ratio of a weighted average energy of high-band signals to a weighted average energy of low-band signals of a noise frame and a noise frame prior to the noise frame at the moment when the SID including the noise high-band parameter is sent last time before the noise frame.

In this embodiment, the generating a deviation according to a first ratio and a second ratio includes: separately calculating a logarithmic value of the first ratio and a logarithmic value of the second ratio; and calculating an absolute value of a difference between the logarithmic value of the first ratio and the logarithmic value of the second ratio, to obtain the deviation.

Optionally, in this embodiment, the encoding and transmitting the noise high-band signal using a second discontinuous transmission mechanism includes: determining whether a spectral structure of the noise high-band signal of the noise frame, in comparison with an average spectral structure of noise high-band signals before the noise frame, satisfies a preset condition; if yes, encoding an SID of the noise high-band signal of the noise frame using the policy for encoding the second SID, and sending the SID; and if not, determining that the noise high-band signal of the noise frame does not need to be encoded and transmitted.

The average spectral structure of the noise high-band signals before the noise frame includes a weighted average of spectrums of the noise high-band signals before the noise frame.

In this embodiment, the sending condition in the policy for sending the second SID of the second discontinuous transmission mechanism further includes the first discontinuous transmission mechanism satisfying a condition for sending the first SID.

The method embodiment provided by the present disclosure brings the following beneficial effects: a current noise frame of an audio signal is obtained, and the current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 2

Figure 2:
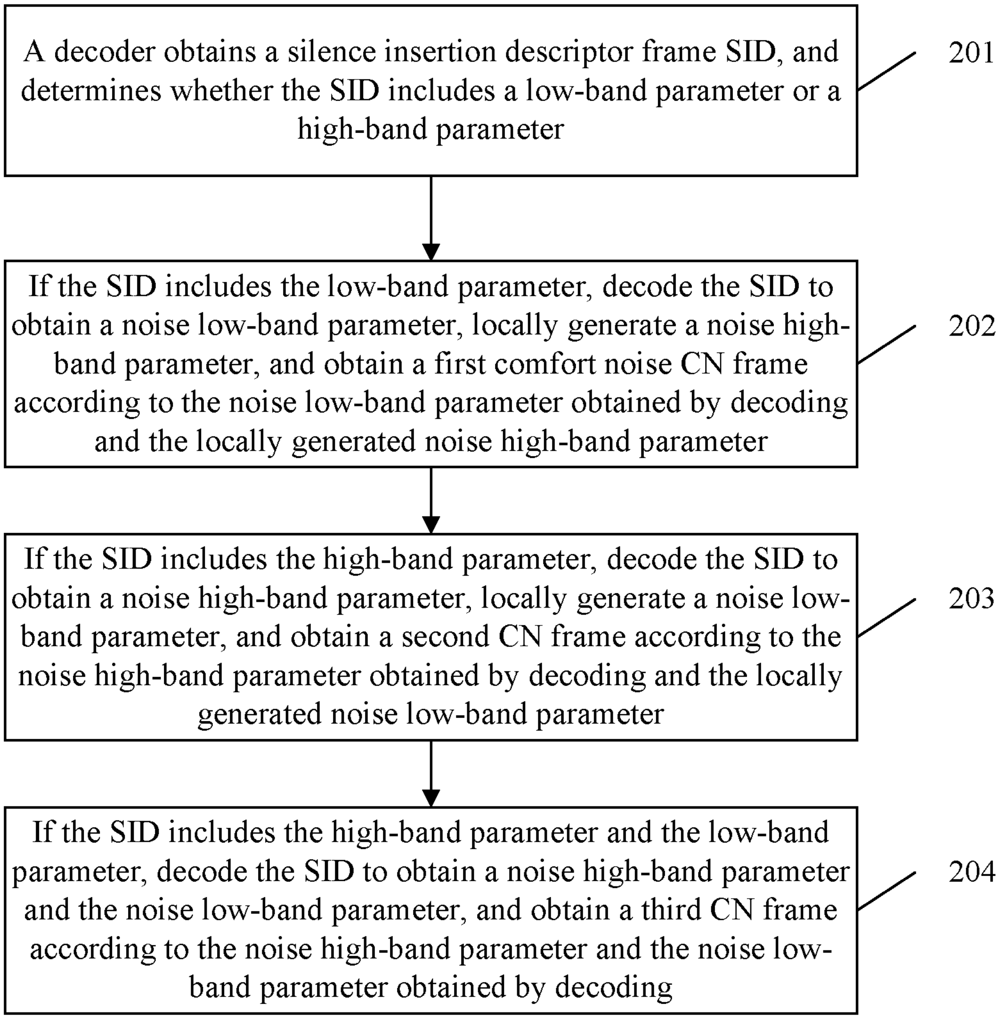
FIG. 2 is a flowchart of a method for processing audio data according to Embodiment 2 of the present disclosure.

Referring to FIG. 2, this embodiment provides a method for processing audio data, where the method includes the following steps.

201. A decoder obtains an SID, and determines whether the SID includes a low-band parameter or a high-band parameter.

202. If the SID includes the low-band parameter, decode the SID to obtain a noise low-band parameter, locally generate a noise high-band parameter, and obtain a first CN frame according to the noise low-band parameter obtained by decoding and the locally generated noise high-band parameter.

203. If the SID includes the high-band parameter, decode the SID to obtain a noise high-band parameter, locally generate a noise low-band parameter, and obtain a second CN frame according to the noise high-band parameter obtained by decoding and the locally generated noise low-band parameter.

204. If the SID includes the high-band parameter and the low-band parameter, decode the SID to obtain a noise high-band parameter and a noise low-band parameter, and obtain a third CN frame according to the noise high-band parameter and the noise low-band parameter obtained by decoding.

Optionally, in this embodiment, if the SID includes the low-band parameter, before the decoding the SID to obtain a noise low-band parameter, locally generating a noise high-band parameter, and obtaining a first CN frame according to the noise low-band parameter obtained by decoding and the locally generated noise high-band parameter, the method further includes, if the decoder is in a first comfort noise generation (CNG) state, entering, by the decoder, a second CNG state.

Optionally, in this embodiment, if the SID includes the high-band parameter and the low-band parameter, before the decoding the SID to obtain a noise high-band parameter and a noise low-band parameter, and obtaining a third CN frame according to the noise high-band parameter and the noise low-band parameter obtained by decoding, the method further includes, if the decoder is in a second CNG state, entering, by the decoder, a first CNG state.

Optionally, in this embodiment, the determining whether the SID includes a low-band parameter and/or a high-band parameter includes: if the number of bits of the SID is smaller than a preset first threshold, determining that the SID includes the high-band parameter; if the number of bits of the SID is greater than a preset first threshold and smaller than a preset second threshold, determining that the SID includes the low-band parameter; and if the number of bits of the SID is greater than a preset second threshold and smaller than a preset third threshold, determining that the SID includes the high-band parameter and the low-band parameter. Alternatively, the determining whether the SID includes a low-band parameter and/or a high-band parameter includes: if the SID includes a first identifier, determining that the SID includes the high-band parameter; if the SID includes a second identifier, determining that the SID includes the low-band parameter; and if the SID includes a third identifier, determining that the SID includes the low-band parameter and the high-band parameter.

In this embodiment, the locally generating a noise high-band parameter includes: separately obtaining a weighted average energy of a noise high-band signal and a synthesis filter coefficient of the noise high-band signal at a moment corresponding to the SID; and obtaining the noise high-band signal according to the obtained weighted average energy of the noise high-band signal and the obtained synthesis filter coefficient of the noise high-band signal at the moment corresponding to the SID.

Optionally, in this embodiment, the obtaining a weighted average energy of a noise high-band signal at a moment corresponding to the SID includes: obtaining an energy of a low-band signal of the first CN frame according to the noise low-band parameter obtained by decoding; calculating a ratio of an energy of a noise high-band signal to an energy of a noise low-band signal at a moment when an SID including a high-band parameter is received before the SID, to obtain a first ratio; obtaining, according to the energy of the low-band signal of the first CN frame and the first ratio, an energy of the noise high-band signal at the moment corresponding to the SID; and performing weighted averaging on the energy of the noise high-band signal at the moment corresponding to the SID and an energy of a high-band signal of a locally buffered CN frame, to obtain the weighted average energy of the noise high-band signal at the moment corresponding to the SID, where the weighted average energy of the noise high-band signal at the moment corresponding to the SID is a high-band signal energy of the first CN frame.

Optionally, in this embodiment, the calculating a ratio of an energy of a noise high-band signal to an energy of a noise low-band signal at a moment when an SID including a high-band parameter is received before the SID, to obtain a first ratio, includes: calculating a ratio of an instant energy of the noise high-band signal to an instant energy of the noise low-band signal at the moment when the SID including the high-band parameter is received before the SID, to obtain the first ratio; or calculating a ratio of a weighted average energy of the noise high-band signal to a weighted average energy of the noise low-band signal at the moment when the SID including the high-band parameter is received before the SID, to obtain the first ratio.

When the energy of the noise high-band signal at the moment corresponding to the SID is greater than an energy of a high-band signal of a previous CN frame that is locally buffered, the energy of the high-band signal of the previous CN frame that is locally buffered is updated at a first rate. Otherwise, the energy of the high-band signal of the previous CN frame that is locally buffered is updated at a second rate, where the first rate is greater than the second rate.

Optionally, in this embodiment, the obtaining a weighted average energy of a noise high-band signal at a moment corresponding to the SID includes: selecting a high-band signal of a speech frame with a minimum high-band signal energy from speech frames within a preset period of time before the SID, and obtaining, according to an energy of the high-band signal of the speech frame with the minimum high-band signal energy among the speech frames, the weighted average energy of the noise high-band signal at the moment corresponding to the SID, where the weighted average energy of the noise high-band signal at the moment corresponding to the SID is a high-band signal energy of the first CN frame; or selecting high-band signals of N speech frames with a high-band signal energy smaller than a preset threshold from speech frames within a preset period of time before the SID, and obtaining, according to a weighted average energy of the high-band signals of the N speech frames, the weighted average energy of the noise high-band signal at the moment corresponding to the SID, where the weighted average energy of the noise high-band signal at the moment corresponding to the SID is a high-band signal energy of the first CN frame.

Optionally, in this embodiment, the obtaining a synthesis filter coefficient of the noise high-band signal at a moment corresponding to the SID includes: distributing M Immittance Spectral Frequency (ISF) coefficients or ISP coefficients or Line Spectral Frequency (LSF) coefficients or Line Spectral Pair (LSP) coefficients in a frequency range corresponding to a high-band signal; performing randomization processing on the M coefficients, where a feature of the randomization is causing each coefficient among the M coefficients to gradually approach a target value corresponding to each coefficient, where the target value is a value in a preset range adjacent to a coefficient value, where the target value of each coefficient among the M coefficients changes after every N frames, and where both the M and the N are natural numbers; and obtaining, according to the filter coefficients obtained by randomization processing, the synthesis filter coefficient of the noise high-band signal at the moment corresponding to the SID.

Optionally, in this embodiment, the obtaining a synthesis filter coefficient of the noise high-band signal at a moment corresponding to the SID includes: obtaining M ISF coefficients or ISP coefficients or LSF coefficients or LSP coefficients of a locally buffered noise high-band signal; performing randomization processing on the M coefficients, where a feature of the randomization is causing each coefficient among the M coefficients to gradually approach a target value corresponding to each coefficient, where the target value is a value in a preset range adjacent to a coefficient value, and where the target value of each coefficient among the M coefficients changes after every N frames; and obtaining, according to the filter coefficients obtained by randomization processing, the synthesis filter coefficient of the noise high-band signal at the moment corresponding to the SID.

Optionally, in this embodiment, before the obtaining a first CN frame according to the noise low-band parameter obtained by decoding and the locally generated noise high-band parameter, the method further includes, when history frames adjacent to the SID are encoded speech frames, if an average energy of high-band signals or a part of high-band signals that are decoded from the encoded speech frames is smaller than an average energy of noise high-band signals or a part of the noise high-band signals that are generated locally, multiplying noise high-band signals of subsequent L frames starting from the SID by a smoothing factor smaller than 1, to obtain a new weighted average energy of the locally generated noise high-band signals. Correspondingly, the obtaining a first CN frame according to the noise low-band parameter obtained by decoding and the locally generated noise high-band parameter includes obtaining a fourth CN frame according to the noise low-band parameter obtained by decoding, the synthesis filter coefficient of the noise high-band signal at the moment corresponding to the SID, and the new weighted average energy of the locally generated noise high-band signals.

The method embodiment provided by the present disclosure brings the following beneficial effects, a decoder obtains an SID, and determines whether the SID includes a low-band parameter and/or a high-band parameter. If the SID includes the low-band parameter, the decoder decodes the SID to obtain a noise low-band parameter, locally generates a noise high-band parameter, and obtains a first CN frame according to the noise low-band parameter obtained by decoding and the locally generated noise high-band parameter. If the SID includes the high-band parameter, the decoder decodes the SID to obtain a noise high-band parameter, locally generates a noise low-band parameter, and obtains a second CN frame according to the noise high-band parameter obtained by decoding and the locally generated noise low-band parameter. If the SID includes the high-band parameter and the low-band parameter, the decoder decodes the SID to obtain a noise high-band parameter and a noise low-band parameter, and obtains a third CN frame according to the noise high-band parameter and the noise low-band parameter obtained by decoding. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 3

Figure 3:
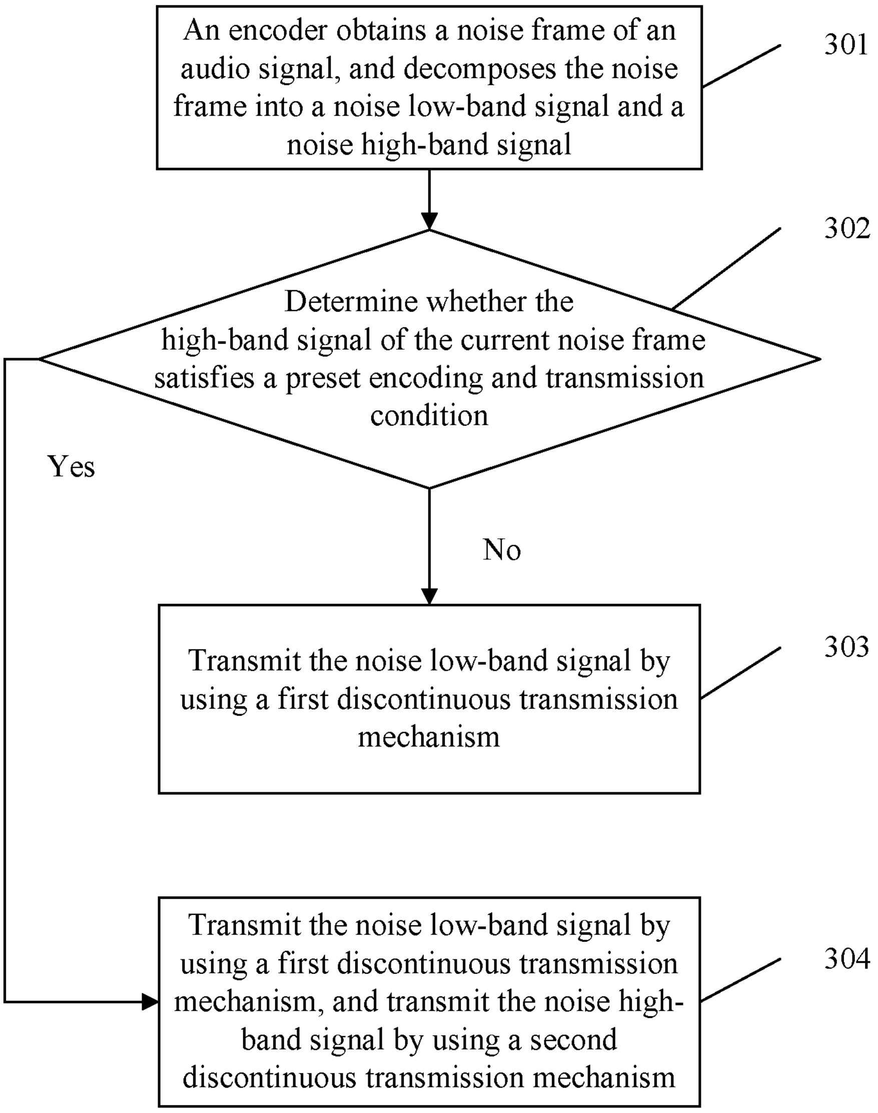
FIG. 3 is a flowchart of a method for processing audio data according to Embodiment 3 of the present disclosure.

This embodiment provides a method for processing audio data. At an encoding end, regardless of a low-band CNG noise spectrum or a high-band CNG noise spectrum, generally, a harmonic structure is lost, and therefore, in a CNG high-band signal, what is perceptually effective on hearing is mainly an energy of the CNG high-band signal, and not a spectral structure of the CNG high-band signal. Therefore, in DTX transmission of a super-wideband signal, in many cases, it is unnecessary to transmit a high-band signal spectrum in an SID, instead, a proper method may be used to construct a high-band spectrum locally at a decoding end. The locally constructed high-band spectrum will not cause an obvious perceptual distortion. In this way, calculation loads and bits for calculating and encoding the high-band spectrum are saved at the encoding end. However, for other noise signals, a harmonic structure may exist in a high-band signal thereof, and constructing a high-band spectrum locally at the decoding end alone may cause a problem of perceptual quality deterioration in switching between a CNG segment and a speech segment. Therefore, for such noise, a spectral parameter needs to be transmitted in an SID. It can be seen that a DTX/CNG system that takes both efficiency and quality into account should be capable of adaptively selecting to encode or selecting not to encode a high-band spectral parameter in an SID at the encoding end according to a high-band feature of background noise, and reconstructing a CNG frame at the decoding end using different decoding methods according to different types of SIDs. In this embodiment, a method for processing audio data is provided and includes the following a noise high-band spectrum is analyzed and classified, a decoder blindly constructs a high-band signal spectrum, when an SID does not include a high-band energy parameter, the decoder estimates a high-band signal energy, and the decoder switches between different CNG modules, and so on. Referring to FIG. 3, a method for processing audio data at an encoder end according to this embodiment includes the following steps.

301. An encoder obtains a noise frame of an audio signal, and decomposes the noise frame into a noise low-band signal and a noise high-band signal.

In this embodiment, because of different encoding rules of the encoder, the encoder obtains a noise frame of an audio signal, and the noise frame may be a current noise frame, or may be a noise frame buffered at the encoder end, which is not specifically limited in this embodiment. In this embodiment, super-wideband input audio signals sampled at 32 kilohertz (kHz) are used as an example. The encoder first performs framing processing on the input audio signals, for example, 20 milliseconds (ms) (or 640 sampling points) is used as a frame. For the current frame (in this embodiment, the current frame refers to a current frame to be encoded), the encoder first performs high-pass filtering. Generally, a passband refers to frequencies higher than 50 Hertz (Hz). The high-pass filtered current frame is decomposed into a low-band signal so and a high-band signal $s_1$ by a quadrature mirror filter (QMF) analysis filter. The low-band signal so is sampled at 16 kHz, and represents a 0-8 kHz spectrum of the current frame. The high-band signal $s_1$ is also sampled at 16 kHz, and represents an 8-16 kHz spectrum of the current frame. When a Voice Activity Detector (VAD) indicates that the current frame is a foreground signal frame, that is, a speech signal frame, the encoder performs speech encoding on the current frame. The VAD indicates that the encoder enters a DTX working state when the current frame is a noise frame. In this embodiment, the noise frame refers to either a background noise frame or a silence frame.

In this embodiment, in the DTX working state, a DTX controller decides, according to an SID sending policy, whether to encode and send an SID of the low-band signal of the current frame. In this embodiment, the policy for sending an SID of a low-band signal is as follows (1) sending an SID in a first noise frame after an encoded speech frame, and setting an SID sending flag $flag_{SID}$ to 1, (2) in a noise period, sending an SID frame in an $N^{th}$ frame after each SID frame, and setting $flag_{SID}$ to 1 in the frame, where N is an integer greater than 1 and is externally input to the encoder, and (3) in the noise period, sending no SID in other frames, and setting $flag_{SID}$ to 0.

302. Determine whether the high-band signal of the current noise frame satisfies a preset encoding and transmission condition, if yes, perform step 304, if not, perform step 303.

In this embodiment, the determining whether the high-band signal of the current noise frame satisfies a preset encoding and transmission condition includes determining whether the noise high-band signal has a preset spectral structure, if yes, and a sending condition of a policy for sending the second SID is satisfied, encoding an SID of the noise high-band signal using the policy for encoding the second SID, and sending the SID, and if not, determining that the noise high-band signal does not need to be encoded and transmitted. The determining whether the noise high-band signal has a preset spectral structure includes obtaining a spectrum of the noise high-band signal, dividing the spectrum into at least two sub-bands, and if an average energy of any first sub-band in the sub-bands is not smaller than an average energy of a second sub-band in the sub-bands, where a frequency band in which the second sub-band is located is higher than a frequency band in which the first sub-band is located, determining that the noise high-band signal has no preset spectral structure, otherwise, determining that the noise high-band signal has a preset spectral structure.

In this embodiment, in the DTX working state, the encoder performs spectral analysis on the high-band signal $s_1$ of the current noise frame to determine whether $s_1$ has an apparent spectral structure, that is, a preset spectral structure. A specific method in this embodiment is as follows down sampling to 12.8 kHz is performed on $s_1$, and 256-point Fast Fourier Transform (FFT) is performed on the down-sampled signal to obtain a spectrum C(i), where i=0, . . . 127. C(i) is divided into four sub-bands of an equal width, and an energy E(i) of each sub-band is calculated. Each sub-band is any first sub-band mentioned above.

$$E(i) = \sum_{i=l(i)}^{h(i)} C(i),$$

where i=0, . . . 3, l(i) and h(i) respectively represent an upper boundary and a lower boundary of the $i^{th}$ sub-band, l(i)={0, 32, 64, 96}, and h(i)={31, 63, 95, 127}. Whether the following condition is satisfied is checked:

$$E(i) \geq \forall E(j)\ j > i \tag{1}$$

where E(j) is the second sub-band mentioned above. If the foregoing formula (1) is satisfied, that is, if the energy of any first sub-band in the sub-bands is not smaller than the energy of the second sub-band in the sub-bands, it is considered that the high-band signal does not have an apparent spectral structure, otherwise, the high-band signal has an apparent spectral structure. If the high-band signal has an apparent spectral structure, a DTX policy is sending a high-band parameter. In this embodiment, if a high-band parameter sending flag $flag_{hb}$ is not 1, $flag_{hb}$=1 is set next time when $flag_{SID}$=1, otherwise, $flag_{hb}$=0.

In this embodiment, when the SID sending condition is satisfied, whether it is necessary to encode and transmit the high-band signal of the current noise frame may be determined using the spectral structure of the high-band signal of the current noise frame, and the determining whether the noise high-band signal has a preset spectral structure and whether the noise low-band signal satisfies the SID sending condition is used as a first determining condition. Optionally, in this embodiment, the determining whether the high-band signal of the current noise frame satisfies a preset encoding and sending condition includes generating a deviation according to a first ratio and a second ratio, where the first ratio is a ratio of an energy of the noise high-band signal to an energy of the noise low-band signal of the noise frame, and the second ratio is a ratio of an energy of a noise high-band signal to an energy of a noise low-band signal at a moment when an SID including a noise high-band parameter is sent last time before the noise frame, and determining whether the deviation reaches a preset threshold, if yes, encoding an SID of the noise high-band signal using the policy for encoding the second SID, and sending the SID, and if not, determining that the noise high-band signal does not need to be encoded and transmitted. Optionally, that the first ratio is a ratio of an energy of the noise high-band signal to an energy of the noise low-band signal of the noise frame includes that the first ratio is a ratio of an instant energy of the noise high-band signal to an instant energy of the noise low-band signal of the noise frame, and correspondingly, that the second ratio is a ratio of an energy of a noise high-band signal to an energy of a noise low-band signal at a moment when an SID including a noise high-band parameter is sent last time before the noise frame includes that the second ratio is a ratio of an instant energy of the noise high-band signal to an instant energy of the noise low-band signal at the moment when the SID including the noise high-band parameter is sent last time before the noise frame. Alternatively, that the first ratio is a ratio of an energy of the noise high-band signal to an energy of the noise low-band signal of the noise frame includes that the first ratio is a ratio of a weighted average energy of noise high-band signals of the noise frame and a noise frame prior to the noise frame to a weighted average energy of noise low-band signals of the noise frame and the noise frame prior to the noise frame, and correspondingly, that the second ratio is a ratio of an energy of a noise high-band signal to an energy of a noise low-band signal at a moment when an SID including a noise high-band parameter is sent last time before the noise frame includes that the second ratio is a ratio of a weighted average energy of high-band signals to a weighted average energy of low-band signals of a noise frame and a noise frame prior to the noise frame at the moment when the SID including the noise high-band parameter is sent last time before the noise frame. In this embodiment, preferably, the generating a deviation according to a first ratio and a second ratio includes separately calculating a logarithmic value of the first ratio and a logarithmic value of the second ratio, and calculating an absolute value of a difference between the logarithmic value of the first ratio and the logarithmic value of the second ratio, to obtain the deviation.

In this embodiment, the determining whether the deviation reaches a preset threshold may be implemented in the following manner.

In the DTX working state, the encoder separately calculates logarithmic energies $e_1$ and $e_0$ of the high-band signal s and low-band signal so of the current frame.

$$e_x=10\cdot \log_{10}(\Sigma s_x(i)^2)x=0,1i=0,1, \ldots ,319 \quad (2)$$

Long-term moving averages $e_{1a}$ and $e_{0a}$ of $e_1$ and $e_0$ at the encoding end are updated:

$$e_{xa}=e_{xa}^{(-1)}+\alpha\cdot \mathrm{sign}[e_{xa}-e_{xa}^{(-1)}]\cdot \mathrm{MIN}[|e_{xa}-e_{xa}^{(-1)}|,3]x=0,1 \quad (3)$$

where sign[.] represents a sign function, MIN[.] represents a minimum function, |.| represents an absolute value function, form $x^{(-1)}$ represents a value of a previous frame x, and $\alpha=0.1$ is a forgetting factor that decides whether an updating speed is high or low. The previous frame is the SID that is sent last time before the current noise frame and includes the noise high-band parameter. In this embodiment, an update magnitude of $e_{1a}$ and $e_{0a}$ is limited. If an energy variation between $e_x$ of the current noise frame and $e_{xa}$ of the previous frame is greater than 3 decibels (dB), $e_{xa}$ of the current frame is updated by 3 dB. When the encoder enters the DTX working state for the first time, $e_{xa}$ is initialized as $e_x$ of the current frame. The encoder checks whether a deviation between the ratio (namely, the first ratio) of the energy of the high-band signal to the energy of the low-band signal of the current noise frame and the ratio (the second ratio) of the energy of the high band to the energy of the low band at the moment when the SID including the high-band parameter is sent last time reaches an extent, that is, checks whether the following condition is satisfied:

$$|(e_{0a}-e_{1a})-(e_{0a}^{-}-e_{1a}^{-})|>4.5 \quad (4)$$

where $e_{0a}^{-}$ and $e_{1a}^{-}$ respectively represent a high-band logarithmic energy and a low-band logarithmic energy at the moment when the SID frame including the high-band parameter is sent last time. If the foregoing formula (4) is satisfied, the noise high-band signal needs to be encoded and transmitted. If the high-band parameter sending flag $flag_{hb}$–0, $flag_{hb}$–1 is set.

In this embodiment, long-term moving averaging is one type of weighted average calculation, which is not specifically limited in this embodiment.

In this embodiment, the determining whether the deviation reaches a preset threshold may be used as a second determining condition. In a specific implementation process, to determine whether the noise high-band signal needs to be encoded and transmitted, either the first determining condition or the second determining condition just needs to be determined, which is not specifically limited in this embodiment.

In this embodiment, the second determining condition is optional. A purpose of performing this step is to assist a decoding end in locally estimating the energy of the high-band noise according to the energy of the noise low band and the ratio of the energy of the noise high band to the energy of the noise low band at the moment when the SID including the high-band parameter is sent last time. In an embodiment, if the deviation is not calculated at the encoding end, a speech frame with a minimum high-band signal energy may be obtained at the decoding end from speech frames within a period of time before the current noise frame, and the energy of the current high-band noise is estimated locally according to an energy of a high-band signal of the speech frame with the minimum high-band signal energy among the speech frames within the period of time before the current noise frame. For example, the energy of the high-band signal of the speech frame with the minimum high-band signal energy among the speech frames within the period of time before the current noise frame is selected as the energy of the current high-band noise. Alternatively, high-band signals of N speech frames with a high-band signal energy smaller than a preset threshold are selected from speech frames within a preset period of time before the SID, and the weighted average energy of the noise high-band signal at the moment corresponding to the SID is obtained according to a weighted average energy of the high-band signals of the N speech frames. No limitation is set in this embodiment.

303. Transmit the noise low-band signal using a first discontinuous transmission mechanism.

In this embodiment, preferably, the transmitting the noise low-band signal using a first discontinuous transmission mechanism includes, in the DTX working state, the encoder performs $16^{th}$-order linear prediction analysis on the low-band signal so of the current noise frame, and obtains 16 LPCs lpc(i), where i=0, 1, . . . , 15. The LPCs are transformed to ISP coefficients to obtain 16 ISP coefficients isp(i), where i=0, 1, . . . , 15, and the ISP coefficients are buffered. If an SID is encoded in the current frame, that is, $flag_{SID}=1$, a median ISP coefficient is searched in buffered ISP coefficients of N history frames including the current frame. A method is as follows, first, calculate a distance δ from an ISP coefficient of each frame to an ISP coefficient of another frame:

$$\delta_k = \sum_{j=0}^{-N+1} \sum_{i=0}^{15} \left(lsp^{(k)}(i) - lsp^{(j)}(i)\right)^2 j \neq k, k = 0, -1, \ldots , -N+1, \quad (5)$$

then, select an ISP coefficient of a frame with the smallest δ as an ISP coefficient $isp_{SID}(i)$ to be encoded, where i=0, . . . , 15, transform $isp_{SID}(i)$ to an ISF coefficient $isf_{SID}(i)$, quantize the $isf_{SID}(i)$, obtain and encapsulate a group of quantized indexes $idx_{ISF}$ into the SID, locally decode the $idx_{ISF}$, obtain a decoded ISF coefficient isf'(i), where i=0, . . . , 15, transform isf (i) to an ISP coefficient isp'(i), where i=0, . . . , 15, buffer the isp'(i), for each noise frame, update a long-term moving average of the decoded ISP coefficients of the encoding end using the buffered isp'(i):

$$isp_a(i)=\alpha\cdot isp_a^{(-1)}(i)+(1-\alpha)\cdot isp'(i)i=0,1, \ldots 15 \quad (6)$$

where preferably, $\alpha=0.9$, and $isp_a(i)$ is initialized as isp'(i) of a first SID, transform $isp_a(i)$ to an LPC $lpc_a(i)$, obtain an analysis filter A(Z), filter the low-band signal $s_0$ of each noise frame by the A(Z) to obtain a residual signal r(i), where i=0, 1, . . . 319, and calculate a logarithmic residual energy $e_r$:

$$e_r = \log_2\left(\sum_{i=0}^{319} r(i)^2\right) \quad i = 0, 1, \ldots 319. \tag{7}$$

In this embodiment, $e_r$ is buffered. When the $flag_{SID}$ of the current noise frame is 1, a weighted average logarithmic energy $e_{SID}$ is calculated according to buffered $e_r$ of M history frames including the current noise frame:

$$e_{SID} = \frac{\sum_{k=0}^{-M+1} w_1(k) \cdot e_r^{(k)}}{\sum_{k=0}^{-M+1} w_1(k)} - 1.5,$$

where $w_1(k)$ is a group of M-dimensional positive coefficients, and a sum thereof is smaller than 1. $e_{SID}$ is quantized, and a quantized index $idx_e$ is obtained.

In this embodiment, in the DTX working state, when $flag_{SID}$=1, if $flag_{hb}$=0, only a low-band parameter is encoded and sent in an SID frame, and in this case, the SID frame is formed of the $idx_{ISF}$ and $idx_e$, and is referred to as a small SID frame for convenience.

In this embodiment, the policy for encoding and transmitting a noise low-band signal is not described in detail in this embodiment. In this embodiment, the noise high-band signal of the current noise frame does not need to be encoded, and only the noise low-band signal is encoded. Therefore, a calculation load is reduced at the encoding end, and transmission bits are saved.

304. Transmit the noise low-band signal using a first discontinuous transmission mechanism, and transmit the noise high-band signal using a second discontinuous transmission mechanism.

In this embodiment, if $flag_{hb}$=1, in addition that a low-band parameter needs to be encoded, a high-band parameter also needs to be encoded in an SID. The encoding of a low-band parameter of low-band noise is the same as the encoding mode in step 303, and details are not repeatedly described in this embodiment. In this embodiment, preferably, the method for encoding a high-band parameter is as follows, only when the encoder is in the DTX working state and $flag_{SID}$=1, the encoder performs 10th-order linear prediction analysis on the high-band signal $s_1$ of the current frame, and obtains 10 linear prediction coefficients lpc(i), where i=0, 1, . . . , 9. lpc(i) is weighted:

$$lpc_w(i) = w_2(i) \cdot lpc(i) \quad i=0,1, \ldots 9 \tag{8}$$

and a weighted LPC $lpc_w(i)$ is obtained, where $w_2(i)$ represents a group of 9-dimensional weighting factors that are smaller than or equal to 1. $lpc_w(i)$ is transformed to an LSP coefficient to obtain 10 LSP coefficients $lsp_w$ (i), where i=0, 1, . . . , 9, and a long-term moving average of $lsp_w$ (i) of the encoding end is updated according to $lsp_w$ (i).

$$lsp_a(i) = \alpha \cdot lsp_a^{(-1)}(i) + (1-\alpha) \cdot lsp_w(i) \quad i=0,1, \ldots 9 \tag{9}$$

where preferably, α=0.9, and $lsp_a$ (i) is initialized as $lsp_w$ (i) of the current frame every time when $flag_{hb}$ changes from 0 to 1. When the SID needs to include high-band parameters, $lsp_a$ (i) is quantized, and a group of quantized indexes $idx_{LSP}$ is obtained. A long-term moving average $e_{1a}$ of logarithmic energies of the high-band signals at the encoding end is quantized, and a quantized index $idx_E$ is obtained. In this case, the SID is formed of the $idx_{ISF}$, $idx_e$, $idx_{LSP}$, and $idx_E$. In this embodiment, the SID formed of the $idx_{ISF}$, $idx_e$, $idx_{LSP}$, and $idx_E$ is referred to as a large SID.

Optionally, $lsp_a$ (i) may also be updated continuously in the DTX working state. That is, no matter whether the value of $flag_{hb}$ is 1 or 0, $lsp_a$ (i) is updated. In an embodiment, the method for updating $lsp_a$ (i) when $flag_{hb}$=0 is the same as the foregoing method when $flag_{hb}$=1, and details are not repeatedly described in this embodiment.

In this embodiment, a principle of the policy for encoding a noise high-band signal is similar to that of the policy for encoding a noise low-band signal. Only a brief introduction is provided in this embodiment. The specific implementation process is not described in detail in this embodiment.

In this embodiment, when the condition for encoding and transmitting a noise high-band signal is satisfied, the encoding and transmission of the noise high-band signal are always performed simultaneously with the encoding and transmission of a noise low-band signal. However, optionally, the encoding and transmission of the noise high-band signal may also not be performed simultaneously with the encoding and transmission of the noise low-band signal. That is, when the SID is sent, three possible cases may exist, (1) only the low-band signal of the current noise frame is encoded and transmitted, (2) only the high-band signal of the current noise frame is encoded and transmitted, and (3) the low-band signal and the high-band signal of the current noise frame are encoded and transmitted simultaneously, and in this case, the sending condition in the policy for sending the second SID of the second discontinuous transmission mechanism further includes the first discontinuous transmission mechanism satisfying the first SID sending condition. The three cases of sending the SID are not specifically limited in this embodiment.

In this embodiment, steps 302 to 304 are steps of encoding and transmitting the noise low-band signal using the first discontinuous transmission mechanism, and encoding and transmitting the noise high-band signal using the second discontinuous transmission mechanism, where a policy for sending a first SID of the first discontinuous transmission mechanism is different from a policy for sending a second SID of the second discontinuous transmission mechanism, or where a policy for encoding a first SID of the first discontinuous transmission mechanism is different from a policy for encoding a second SID of the second discontinuous transmission mechanism.

The method embodiment provided by the present disclosure brings the following beneficial effects, a current noise frame of an audio signal is obtained, and the current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 4

Figure 4:
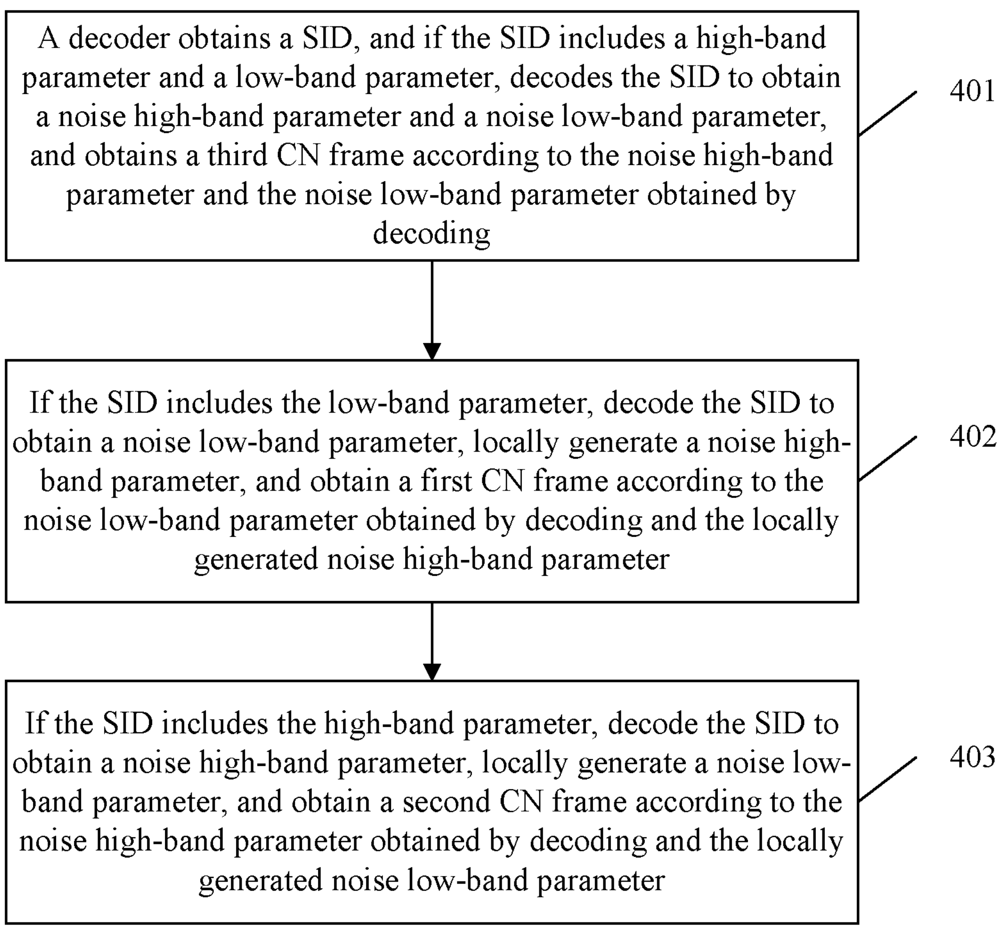
FIG. 4 is a flowchart of a method for processing audio data according to Embodiment 4 of the present disclosure.

This embodiment provides a method for processing audio data. In comparison with processing of a noise signal at an encoder end, a decoder end may determine, according to a received bit stream, whether a current frame is an encoded speech frame or an SID or a NO_DATA frame. The NO_DATA frame is a frame indicating that the encoding end does not encode and send an SID in a noise period. When the current frame is an SID, the decoder may further determine, according to the number of bits of the SID, whether the SID includes a low-band and/or high-band parameter. Optionally, the decoder may also determine, according to a specific identifier inserted in the SID, whether the SID includes a low-band and/or high-band parameter. This requires that an additional identifier bit should be added when the SID is encoded. For example, when a first identifier is inserted in the SID, it identifies that the SID includes only a high-band parameter, when a second identifier is inserted, it identifies that the SID includes only a low-band parameter, and when a third identifier is inserted, it identifies that the SID includes a high-band parameter and a low-band parameter. If the current frame is an encoded speech frame, the decoder decodes the speech frame. When the current frame is an SID or a NO_DATA frame, the decoder selects, according to a specific working state of CNG, a corresponding method to reconstruct a CN frame. In this embodiment, the CNG has two working states, a half-decoding CNG state corresponding to a small SID frame, namely, a first CNG state, and a full-decoding CNG state corresponding to a large SID frame, namely, a second CNG state. In the full-decoding CNG state, the decoder reconstructs a CN frame according to a noise high-band parameter and a noise low-band parameter obtained by decoding a large SID frame. In the half-decoding CNG state, the decoder reconstructs a CN frame according to a noise low-band parameter obtained by decoding a small SID frame and a locally estimated noise high-band parameter. When the current frame at the decoding end is a large SID frame, if a CNG working state flag $flag_{CNG}$ is 0 (indicating the half-decoding CNG state), the CNG working state flag $flag_{CNG}$ is set to 1 (indicating the full-decoding CNG state), otherwise, the original state remains unchanged. Similarly, when the current frame at the decoding end is a small SID frame, if the CNG working state flag $flag_{CNG}$ is 1, the CNG working state flag $flag_{CNG}$ is set to 0, otherwise, the original state remains unchanged. Referring to FIG. 4, this embodiment provides a method for processing audio data at a decoder end, where the method includes the following steps.

401. A decoder obtains an SID, and if the SID includes a high-band parameter and a low-band parameter, decodes the SID to obtain a noise high-band parameter and a noise low-band parameter, and obtains a third CN frame according to the noise high-band parameter and the noise low-band parameter obtained by decoding.

In this embodiment, after receiving an encoded speech frame sent by an encoder end, the decoder end first determines the type of the speech frame, so that different decoding manners are correspondingly used according to different types of speech frames. In an embodiment, if the number of bits of the SID is smaller than a preset first threshold, it is determined that the SID includes the high-band parameter, if the number of bits of the SID is greater than a preset first threshold and smaller than a preset second threshold, it is determined that the SID includes the low-band parameter, and if the number of bits of the SID is greater than a preset second threshold and smaller than a preset third threshold, it is determined that the SID includes the high-band parameter and the low-band parameter. Alternatively, if the SID includes a first identifier, it is determined that the SID includes the high-band parameter, if the SID includes a second identifier, it is determined that the SID includes the low-band parameter, or if the SID includes a third identifier, it is determined that the SID includes the low-band parameter and the high-band parameter.

In this embodiment, if the SID includes the high-band parameter and the low-band parameter, the SID is decoded to obtain the noise high-band parameter and the noise low-band parameter, and the third CN frame is obtained according to the noise high-band parameter and the noise low-band parameter obtained by decoding. In an embodiment, the decoder decodes the SID to obtain a decoded low-band excitation logarithmic energy $e_D$, a low-band ISF coefficient $isf_d(i)$, a high-band logarithmic energy $E_D$, and a high-band LSP coefficient $lsp_a(i)$. $isf_d(i)$ is transformed an ISP coefficient $isp_d(i)$, and $e_D$ and $E_D$ are transformed to energies $e_d$ and $E_d$, where $E_d=10^{0.1E_D}$ and $e_d=2^{e_D}$, and then $isp_d(i)$, $e_d$, $lsp_a(i)$, and $E_d$ are buffered.

In this embodiment, when the decoder is in the CNG working state and $flag_{CNG}=1$, no matter whether the current frame is an SID or a NO_DATA frame, the buffered $isp_d(i)$, $e_d$, $lsp_a(i)$, and $E_d$ are used to update a long-term moving average of each of the buffered $isp_d(i)$, $e_d$, $lsp_a(i)$, and $E_d$ at the decoding end:

$$isp_{CN}(i)=\alpha\cdot isp_{CN}^{(-1)}(i)+(1-\alpha)\cdot isp_d(i) \quad i=0,1,\ldots 15$$

$$isp_{CN}(i)=\beta\cdot isp_{CN}^{(-1)}(i)+(1-\beta)\cdot isp_d(i) \quad i=0,1,\ldots 9$$

$$e_{CN}=\beta\cdot e_{CN}^{(-1)}+(1-\beta)\cdot e_d$$

$$E_{CN}=\beta\cdot E_{CN}^{(-1)}+(1-\beta)\cdot E_d \tag{10}$$

where $\alpha=0.9$, and $\beta=0.7$. $E_{CN}$ is buffered to a high-band energy buffer $E_{1old}$. A random small energy is added on the basis of $e_{CN}$, and a final excitation energy $e'_{CN}$ used to reconstruct a low-band noise signal is obtained: $e_{CN}'=(1+0.000011\cdot RND\cdot e_{CN})\cdot e_{CN}$, where RND represents a random number within a range of [−32767, 32767]. In this embodiment, a 320-point white noise sequence $exc_0(i)$ is generated, where i=0, 1, . . . 319. $e'_{CN}$ is used to perform gain adjustment on $exc_0(i)$ to obtain $exc'_0(i)$, that is, $exc_0(i)$ is multiplied by a gain coefficient $G_0$, so that the energy of $exc'_0(i)$ is equal to $e'_{CN}$, where $$G_0 = \sqrt[2]{\frac{e_{CN}}{\sum_{i=0}^{319} exc_0(i)}}.$$

$isp_{CN}(i)$ is transformed to an LPC to obtain a synthesis filter $1/A_0(Z)$, the gain-adjusted excitation $exc'_0(i)$ is used to excite the filter $1/A(Z)$ to obtain a low-band CN signal $s'_0$ that is reconstructed at the decoding end and sampled at 16 kHz, and an energy of $s'_0$ is calculated and buffered to a low-band energy buffer $E_{0old}$.

In this embodiment, the processing of a noise high-band signal at the decoding end is similar to the processing of a noise low-band signal. Another 320-point white noise sequence $exc_1(i)$ is generated, where i=0, 1, . . . 319, $lsp_{CN}(i)$ is transformed to an LPC to obtain a synthesis filter $1/A_1(Z)$, and $exc_1(i)$ is used to excite the filter $1/A_1(Z)$ to obtain a gain-unadjusted high-band CN signal $s^{\sim}_1(i)$. $s^{\sim}_1(i)$ is multiplied by gain coefficients $G_1$ and $G_2$, where $G_2=0.8$, and a high-band CN signal $s'_1$ that is reconstructed at the decoding end and sampled at 16 kHz is obtained, where, $$G_1 = \sqrt[2]{\frac{E_{CN}}{\sum_{i=0}^{319} s_1^{\sim}(i)}}.$$

In this embodiment, the purpose of $G_2$ is to perform energy suppression on the reconstructed noise signal to some extent.

In this embodiment, at the decoder end, $s'_0$ and $s'_1$ are passed through a QMF synthesis filter, and finally a first CN frame that is reconstructed by the decoder and sampled at 32 kHz is obtained.

402. If the SID includes the low-band parameter, decode the SID to obtain a noise low-band parameter, locally generate a noise high-band parameter, and obtain a first CN frame according to the noise low-band parameter obtained by decoding and the locally generated noise high-band parameter.

In this embodiment, when the decoder is in the CNG working state and $flag_{CNG}=0$, no matter whether the current frame is an SID or a NO_DATA frame, a low-band CN signal $s'_0$ that is reconstructed at the decoding end and sampled at 16 kHz is obtained according to the same method that is used when $flag_{CNG}=1$, namely, the method in step 402, which is not further described in this embodiment.

In this embodiment, a high-band signal of the first CN frame is obtained still using the method of exciting a synthesis filter using white noise, except that an energy of the high-band signal of the first CN frame and a synthesis filter coefficient are obtained by performing estimation locally. In this embodiment, the locally generating a noise high-band parameter includes separately obtaining a weighted average energy of a noise high-band signal and a synthesis filter coefficient of the noise high-band signal at a moment corresponding to the SID, and obtaining the noise high-band signal according to the obtained weighted average energy of the noise high-band signal and the obtained synthesis filter coefficient of the noise high-band signal at the moment corresponding to the SID.

In this embodiment, preferably, the obtaining a weighted average energy of a noise high-band signal at a moment corresponding to the SID includes obtaining an energy of a low-band signal of the first CN frame according to the noise low-band parameter obtained by decoding, calculating a ratio of an energy of a noise high-band signal to an energy of a noise low-band signal at a moment when an SID including a high-band parameter is received before the SID, to obtain a first ratio, obtaining, according to the energy of the low-band signal of the first CN frame and the first ratio, an energy of the noise high-band signal at the moment corresponding to the SID, and performing weighted averaging on the energy of the noise high-band signal at the moment corresponding to the SID and an energy of a high-band signal of a locally buffered CN frame, to obtain the weighted average energy of the noise high-band signal at the moment corresponding to the SID, where the weighted average energy of the noise high-band signal at the moment corresponding to the SID is a high-band signal energy of the first CN frame. Optionally, the calculating a ratio of an energy of a noise high-band signal to an energy of a noise low-band signal at a moment when an SID including a high-band parameter is received before the SID, to obtain a first ratio, includes calculating a ratio of an instant energy of the noise high-band signal to an instant energy of the noise low-band signal at the moment when the SID including the high-band parameter is received before the SID, to obtain the first ratio, or calculating a ratio of a weighted average energy of the noise high-band signal to a weighted average energy of the noise low-band signal at the moment when the SID including the high-band parameter is received before the SID, to obtain the first ratio. The instant energy is the energy obtained by decoding. When the energy of the noise high-band signal at the moment corresponding to the SID is greater than an energy of a high-band signal of a previous CN frame that is locally buffered, the energy of the high-band signal of the previous CN frame that is locally buffered is updated at a first rate, otherwise, the energy of the high-band signal of the previous CN frame that is locally buffered is updated at a second rate, where the first rate is greater than the second rate.

In this embodiment, the obtaining a weighted average energy of a noise high-band signal at a moment corresponding to the SID may be implemented using the following method, obtaining an energy $E_0$ of the low-band signal of the first CN frame $s'_0$ according to the noise low-band parameter obtained by decoding, estimating, according to the energy $E_{1old}$ of the high-band signal and $E_{0old}$ of the low-band signal of the previous CN frame in the full-decoding CNG state and $E_0$, an energy $E^{\sim}_1$ of the noise high-band signal at the moment corresponding to the SID, where $$E_1^{\sim} = \left(\frac{E_{1old}}{E_{0old}}\right) \cdot E_0,$$

and updating a long-term moving average $E_{CN}$ of high-band CN signal energies at the decoding end using $E^{\sim}_1$: $E_{CN}=\lambda \cdot E_{CN}^{(-1)}+(1-\lambda)\cdot E_1^{\sim}$, where a coefficient $\lambda$ is a variable, when $E^{\sim}_1>E_{CN}$, $\lambda=0.98$, otherwise, $\lambda=0.9$, where $\lambda=0.98$ is a first rate, and where $\lambda=0.9$ is a second rate.

In this embodiment, if a deviation is not calculated at the encoding end, optionally, the obtaining a weighted average energy of a noise high-band signal at a moment corresponding to the SID includes selecting a high-band signal of a speech frame with a minimum high-band signal energy from speech frames within a preset period of time before the SID, and obtaining, according to an energy of the high-band signal of the speech frame with the minimum high-band signal energy among the speech frames, the weighted average energy of the noise high-band signal at the moment corresponding to the SID, or selecting high-band signals of N speech frames with a high-band signal energy smaller than a preset threshold from speech frames within a preset period of time before the SID, and obtaining, according to a weighted average energy of the high-band signals of the N speech frames, the weighted average energy of the noise high-band signal at the moment corresponding to the SID, where the weighted average energy of the noise high-band signal at the moment corresponding to the SID is a high-band signal energy of the first CN frame.

In this embodiment, preferably, the obtaining a synthesis filter coefficient of the noise high-band signal at a moment corresponding to the SID includes distributing M ISF coefficients or ISP coefficients or LSF coefficients or LSP coefficients in a frequency range corresponding to a high-band signal, performing randomization processing on the M coefficients, where a feature of the randomization is causing each coefficient among the M coefficients to gradually approach a target value corresponding to each coefficient, where the target value is a value in a preset range adjacent to a coefficient value, the target value of each coefficient among the M coefficients changes after every N frames, and N may be a variable, and obtaining, according to the filter coefficients obtained by randomization processing, the synthesis filter coefficient of the noise high-band signal at the moment corresponding to the SID.

In this embodiment, the obtaining a synthesis filter coefficient of the noise high-band signal at a moment corresponding to the SID may be implemented using the following method.

Nine ISF coefficients $isf_{ext}(i)$ are evenly distributed in a frequency band of −16 kHz corresponding to low-band ISF coefficients $isf_d(14)$, where i=0, 1, . . . 8:

$$isf_{ext}(i)=isf_d(14)+0.1\cdot(i+1)\cdot(16000-isf_d(14))\quad i=0,1,\ldots 8 \tag{11}$$

$isf_{ext}(i)$ is transformed to a frequency band of 0-8 kHz, and $isf'_{ext}(i)$ is obtained:

$$isf_{ext}'(i)=isf_{ext}(i)-8000\quad i=0,1,\ldots 8 \tag{12}$$

$isf_{ext}'(i)$ is randomized using a group of 9-dimensional randomization factors R(i), where i=0, 1, . . . 8, and a randomized ISF coefficient $isf_1(i)$ is obtained:

$$isf_1(i)=R(i)\cdot(isf_{ext}'(1)-isf_{ext}(0))+isf_{ext}(i)\quad i=0,1,\ldots 8 \tag{13}$$

where R(i) is obtained according to the following formula (14):

$$R(i)=\alpha\cdot R^{(-1)}(i)+(1-\alpha)\cdot R_t(i)\quad i=0,1,\ldots 8 \tag{14}$$

where α=0.8, and $R_t(i)$ is referred to as a target randomization factor, and obtained according to the following formula:

$$R_t(i)=\begin{cases}1+0.1\,RND(i) & \mathrm{mod}(cnt,10)=0\\ R_t^{(-1)}(i) & \mathrm{mod}(cnt,10)\neq 0\end{cases}\quad i=0,1,\ldots 8. \tag{15}$$

In the foregoing formula (15), RND represents a group of 9-dimensional random number sequences, and random numbers in each dimension are different from each other and all fall within a range of [−1, 1]. cnt is a frame counter. In the CNG working state, when $flag_{CNG}=0$, for each SID frame or NO_DATA frame, 1 is added to the counter. mod(cnt, 10) represents cnt mod 10. In another embodiment, when $R_t(i)$ is calculated, 10 in mod(cnt, 10) may also be a variable, for example, $$R_t(i)=\begin{cases}1+0.1\cdot RND(i) & \mathrm{mod}\,(cnt,N)=0\\ R_t^{(-1)}(i) & \mathrm{mod}\,(cnt,N)\neq 0\end{cases}\quad i=0,1,\ldots 8 \tag{16}$$

$$N=\begin{cases}10+5\cdot RND & \mathrm{mod}\left(cnt,N^{(-1)}\right)=0\\ N^{(-1)} & \mathrm{mod}\left(cnt,N^{(-1)}\right)\neq 0\end{cases}$$

where RND represents a random number within a range of [−1, 1], which is not specifically limited in this embodiment.

In this embodiment, a low-band ISF coefficient $isf_d(15)$ is used as $isf_1(9)$, and synthesized with a randomized ISF coefficient $isf_1(i)$, where i=0, 1, . . . 8, to form a $10^{th}$-order filter ISF coefficient, which is then transformed to an LPC $lpc_1(i)$, where i=0, 1, . . . 9. $lpc_1(i)$ is multiplied by a group of 10-dimensional weighting factors W(i)={0.6699, 0.5862, 0.5129, 0.4488, 0.3927, 0.3436, 0.3007, 0.2631, 0.2302, 0.2014}, and a weighted LPC $lpc^{\sim}_1(i)$ is obtained, that is, a synthesis filter $1/A^{\sim}_1(Z)$ is estimated.

In this embodiment, a 320-point white noise sequence $exc_2(i)$ is generated, where i=0, 1, . . . 319, and $exc_2(i)$ is used to excite the filter $1/A^{\sim}_1(Z)$ to obtain a gain-unadjusted high-band CN signal $s^{\sim}_1(i)$. $s^{\sim}_1(i)$ is multiplied by gain coefficients $G_3$ and $G_4$, where $G_4=0.6$, and a high-band CN signal $s'_1$ that is reconstructed at the decoding end and sampled at 16 kHz is obtained, where $$G_3=\sqrt[2]{\frac{E_{CN}}{\sum_{i=0}^{319}s_1^{\sim}(i)}}.$$

If the current frame is an SID, it is necessary to transform $lpc^{\sim}_1(i)$ to an LSP coefficient $lsp^{\sim}_1(i)$, and use $lsp^{\sim}_1(i)$ to update a long-term moving average of LSP coefficients of high-band signals of CN frames buffered at the decoding end:

$$lsp_{CN}(i)=\beta\cdot lsp_{CN}^{(-1)}(i)+(1-\beta)\cdot lsp_1^{\sim}(i)\quad i=0,1,\ldots 9 \tag{17}$$

where β=0.7.

In this embodiment, optionally, the obtaining a synthesis filter coefficient of the noise high-band signal at a moment corresponding to the SID includes obtaining M ISF coefficients or ISP coefficients or LSF coefficients or LSP coefficients of a locally buffered noise high-band signal, performing randomization processing on the M coefficients, where a feature of the randomization is, causing each coefficient among the M coefficients to gradually approach a target value corresponding to each coefficient, where the target value is a value in a preset range adjacent to a coefficient value, and the target value of each coefficient among the M coefficients changes after every N frames, and obtaining, according to the filter coefficients obtained by randomization processing, the synthesis filter coefficient of the noise high-band signal at the moment corresponding to the SID. No limitation is set in this embodiment.

In this embodiment, after the low-band parameter and high-band parameter are obtained, $s'_0$ and $s'_1$ are passed through a QMF synthesis filter, and finally a first CN frame that is reconstructed by the decoder and sampled at 32 kHz is obtained.

Further, in this embodiment, optionally, before the first CN frame is obtained according to the noise low-band parameter obtained by decoding and the locally generated noise high-band parameter, the locally generated noise high-band parameter may be further optimized, so that comfort noise of a better effect can be obtained. A specific optimization step includes, when history frames adjacent to the SID are encoded speech frames, if an average energy of high-band signals or a part of high-band signals that are decoded from the encoded speech frames is smaller than an average energy of noise high-band signals or a part of the noise high-band signals that are generated locally, multiplying noise high-band signals of subsequent L frames starting from the SID by a smoothing factor smaller than 1, to obtain a new weighted average energy of the locally generated noise high-band signals, and correspondingly, the obtaining a first CN frame according to the noise low-band parameter obtained by decoding and the locally generated noise high-band parameter includes obtaining a fourth CN frame according to the noise low-band parameter obtained by decoding, the synthesis filter coefficient of the noise high-band signal at the moment corresponding to the SID, and the new weighted average energy of the locally generated noise high-band signals.

In this embodiment, when a frame before the current SID is an encoded speech frame, and an energy $E_{sp}$ of a high-band signal of the encoded speech frame is lower than an energy $E_{s'1}$ of $s'_1$, it is necessary to smooth energies of high-band signals of the current SID and subsequent several SIDs (50 frames in this embodiment). A specific smoothing method is multiplying $s'_1$ of the current frame by a gain $G_s$, to obtain smoothed $s'_{1s}$.

$$G_s = \sqrt[2]{1 - 0.02 \cdot (50 - cnt) \cdot \left(1 - E_{s1}^{-1}/E_{s'1}\right)},$$

where, cnt is a frame counter, 1 is added to the counter for each frame starting from the first CN frame after the encoded speech frame, and $E_{s1}^{-1}$ is an energy of a smoothed high-band signal of a previous frame and is initialized as $E_{sp}$ when cnt=1. The smoothing process is performed on only up to 50 frames. In this period, if $E_{s1}^{-1}$ is greater than $E_{s'1}$, the smoothing process is terminated. Optionally, $E_{s1}^{-1}$ and $E_{s'1}$ may also represent energies of only a part of frames, which is not specifically limited in this embodiment. In this embodiment, $s'_0$ and $s'_1$ (or $s'_{1s}$) are passed through a QMF synthesis filter, and finally a CN frame that is reconstructed by the decoder and sampled at 32 kHz is obtained.

403. If the SID includes the high-band parameter, decode the SID to obtain a noise high-band parameter, locally generate a noise low-band parameter, and obtain a second CN frame according to the noise high-band parameter obtained by decoding and the locally generated noise low-band parameter.

In this embodiment, if the SID includes the high-band parameter, the SID is decoded to obtain the high-band parameter, and a noise low-band parameter is generated locally, and a second CN frame is obtained according to the high-band parameter obtained by decoding and the locally generated noise low-band parameter. The method for decoding the high-band parameter is the same as the method in step 401, and details are not repeatedly described in this embodiment. The method for locally generating the low-band parameter is the same as the method for locally generating a wideband parameter, and details are not repeatedly described in this embodiment.

The method embodiment provided by the present disclosure brings the following beneficial effects, a decoder obtains an SID, and determines whether the SID includes a low-band parameter and/or a high-band parameter, if the SID includes the low-band parameter, decodes the SID to obtain a noise low-band parameter, locally generates a noise high-band parameter, and obtains a first CN frame according to the noise low-band parameter obtained by decoding and the locally generated noise high-band parameter, if the SID includes the high-band parameter, decodes the SID to obtain a noise high-band parameter, locally generates a noise low-band parameter, and obtains a second CN frame according to the noise high-band parameter obtained by decoding and the locally generated noise low-band parameter, and if the SID includes the high-band parameter and the low-band parameter, decodes the SID to obtain a noise high-band parameter and a noise low-band parameter, and obtains a third CN frame according to the noise high-band parameter and the noise low-band parameter obtained by decoding. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem. In addition, before the second CN frame is obtained according to the noise low-band parameter obtained by decoding and the locally generated noise high-band parameter, the locally generated noise high-band parameter may be further optimized, so that comfort noise of a better effect can be obtained. Therefore, performance of the decoder is further optimized.

Embodiment 5

This embodiment provides a method for processing audio data. Same as in the method for processing audio data in Embodiment 2, an encoder end obtains a noise frame of an audio signal, and decomposes the noise frame into a noise low-band signal and a noise high-band signal. However, optionally, determining whether the high-band signal of the noise frame satisfies a preset encoding and transmission condition includes determining whether a spectral structure of the noise high-band signal of the noise frame, in comparison with an average spectral structure of noise high-band signals before the noise frame, satisfies a preset condition, if yes, encoding an SID of the noise high-band signal of the noise frame using the policy for sending the second SID, and sending the SID, and if not, determining that the noise high-band signal of the noise frame does not need to be encoded and transmitted. The average spectral structure of the noise high-band signals before the noise frame includes a weighted average of spectrums of the noise high-band signals before the noise frame. In this embodiment, the determining whether a spectral structure of the noise high-band signal of the noise frame, in comparison with an average spectral structure of noise high-band signals before the noise frame, satisfies a preset condition, is used as a third condition for determining whether to encode and transmit the noise high-band signal.

In this embodiment, optionally, whether to encode and transmit the noise high-band signal may also be determined using a second determining condition, which is not specifically limited in this embodiment.

In this embodiment, DTX decides whether to encode and transmit a high-band parameter, that is, setting of $flag_{hb}$ may be decided using the following conditions, (1) whether a third determining condition is satisfied, if yes, setting $flag_{hb}$ to 0, otherwise, setting $flag_{hb}$ to 1, and (2) whether the second determining condition is satisfied, if not, setting $flag_{hb}$ to 0, and if yes, setting $flag_{hb}$ to 1.

In this embodiment, a specific method for implementing the third determining condition may be as follows the encoder obtains a 10th-order LSP coefficient lsp(i) of the noise high-band signal $s_1$ of the current noise frame, where i=0, . . . 9, and optionally, the coefficient may also be an LSF or ISF or ISP coefficient, which is not specifically limited in this embodiment. The LSP or LSF or ISF or ISP coefficient is only a different representation manner in a different domain, but all represent a synthesis filter coefficient, which is not specifically limited in this embodiment. lsp(i) is used to update a moving average thereof:

$$lsp_a(i)=\alpha \cdot lsp_a(i)+(1-\alpha)\cdot lsp(i)\quad i=0, \ldots 9 \tag{18}$$

where $lsp_a(i)$ is a long-term moving average of lsp(i). A spectral distortion between current $lsp_a(i)$ and $lsp_a(i)$ at a moment when an SID frame including a high-band parameter is sent last time is calculated:

$$D_{lsp} = \sum_{i=0}^{9} (lsp_a(i) - lsp_a^-)^2,$$

where $D_{lsp}$ represents the spectral distortion, and $lsp_a^-$ represents $lsp_a(i)$ at the moment when the SID frame including the high-band parameter is sent last time. If $D_{lsp}$ is smaller than a certain threshold, $flag_{hb}$=0 is set, otherwise, $flag_{hb}$=1 is set.

In this embodiment, a working method for encoding the low-band parameter and/or the high-band parameter by the encoder when necessary is basically the same as the working method in Embodiment 3, and details are not repeatedly described in this embodiment.

In this embodiment, when a decoder is in a CNG working state and $flag_{CNG}=0$, it is necessary to locally generate a noise high-band signal. The method for obtaining a weighted average energy of a noise high-band signal at a moment corresponding to an SID is the same as the method in Embodiment 4, and details are not repeatedly described in this embodiment. However, in this embodiment, preferably, obtaining a synthesis filter coefficient of the noise high-band signal at a moment corresponding to the SID includes obtaining M ISF coefficients or ISP coefficients or LSF coefficients or LSP coefficients of a locally buffered noise high-band signal, performing randomization processing on the M coefficients, where a feature of the randomization is causing each coefficient among the M coefficients to gradually approach a target value corresponding to each coefficient, where the target value is a value in a preset range adjacent to a coefficient value, and the target value of each coefficient among the M coefficients changes after every N frames, and obtaining, according to the filter coefficients obtained by randomization processing, the synthesis filter coefficient of the noise high-band signal at the moment corresponding to the SID. In an embodiment, the obtaining a synthesis filter coefficient of the noise high-band signal at a moment corresponding to the SID may be implemented in the following manner.

Assuming $lsp'(i)=lsp_{CN}(i)$, where i=0, . . . 9, $lsp_{CN}(i)$ is a long-term moving average of LSP coefficients of high-band signals of CN frames that are locally buffered at the decoding end. Randomization processing is performed on lsp'(i) using the same method in Embodiment 4, and $lsp_1(i)$ is obtained:

$$\begin{cases} lsp_1(0) = R(0)\cdot(1 - lsp_1(0)) + lsp'(0) \\ lsp_1(i) = R(i)\cdot(lsp'(i) - lsp'(i-1)) + lsp'(i) \end{cases} i = 1, \ldots 9. \quad (19)$$

$lsp_1(i)$ is transformed to an LPC $lpc_1(i)$, and a synthesis filter $1/\tilde{A}_1(Z)$ is obtained after weighting with w(i) using the same method in Embodiment 4. In this embodiment, a 320-point white noise sequence $exc_2(i)$ is generated, where i=0, 1, . . . 319, and $exc_2(i)$ is used to excite the filter $1/\tilde{A}_1(Z)$ to obtain a gain-unadjusted high-band CN signal $\tilde{s}_1(i)$. $\tilde{s}_1(i)$ is multiplied by a gain coefficient G3, and a high-band signal $s'_1$ of a CN frame that is reconstructed at the decoding end and sampled at 16 kHz is obtained. In this embodiment, when the current frame is an SID, $lsp_1(i)$ obtained using this method is not used to update the long-term moving average of the LSP coefficients of the high-band signals of the CN frames that are buffered at the decoding end.

In this embodiment, when the encoder encodes a large SID frame, when a long-term moving average $e_{1a}$ of logarithmic energies of high-band signals is quantized at the encoding end, the quantization is performed after $e_{1a}$ is attenuated (that is, after a value is subtracted). Therefore, in this case, in decoding, it is unnecessary to multiply $\tilde{s}_1(i)$ by G2 or G4 in Embodiment 4. Other steps of the decoding end in this embodiment are similar to the steps in the foregoing embodiment, and details are not repeatedly described in this embodiment.

The method embodiment provided by the present disclosure brings the following beneficial effects, a current noise frame of an audio signal is obtained, and the current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. A decoder obtains an SID, and determines whether the SID includes a low-band parameter and/or a high-band parameter, if the SID includes the low-band parameter, decodes the SID to obtain a noise low-band parameter, locally generates a noise high-band parameter, and obtains a first CN frame according to the noise low-band parameter obtained by decoding and the locally generated noise high-band parameter, if the SID includes the high-band parameter, decodes the SID to obtain a noise high-band parameter, locally generates a noise low-band parameter, and obtains a second CN frame according to the noise high-band parameter obtained by decoding and the locally generated noise low-band parameter, and if the SID includes the high-band parameter and the low-band parameter, decodes the SID to obtain a noise high-band parameter and a noise low-band parameter, and obtains a third CN frame according to the noise high-band parameter and the noise low-band parameter obtained by decoding. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 6

Figure 5:
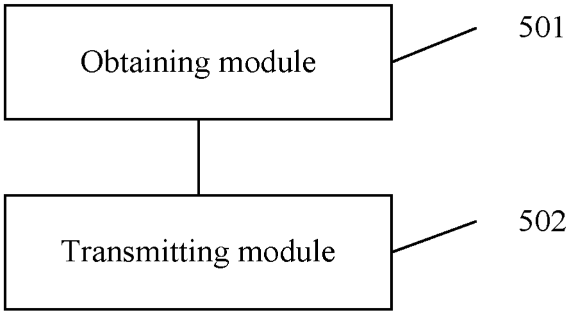
FIG. 5 is a schematic diagram of an apparatus for encoding audio data according to Embodiment 6 of the present disclosure.

Referring to FIG. 5, this embodiment provides an apparatus for encoding audio data, where the apparatus includes an obtaining module 501 and a transmitting module 502.

The obtaining module 501 is configured to obtain a noise frame of an audio signal, and decompose the noise frame into a noise low-band signal and a noise high-band signal.

The transmitting module 502 is configured to: encode and transmit the noise low-band signal using a first discontinuous transmission mechanism; and encode and transmit the noise high-band signal using a second discontinuous transmission mechanism, where a policy for sending a first SID of the first discontinuous transmission mechanism is different from a policy for sending a second SID of the second discontinuous transmission mechanism, or where a policy for encoding a first SID of the first discontinuous transmission mechanism is different from a policy for encoding a second SID of the second discontinuous transmission mechanism.

In this embodiment, the first SID includes a low-band parameter of the noise frame, and the second SID includes a low-band parameter and/or a high-band parameter of the noise frame.

Figure 6:
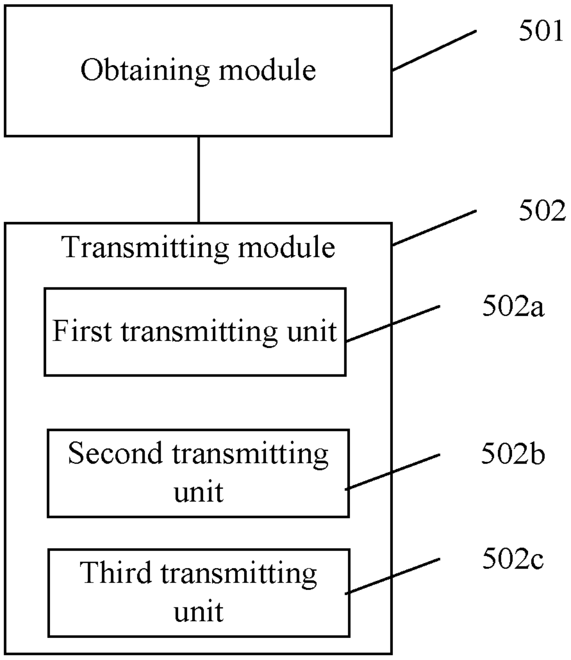
FIG. 6 is a schematic diagram of another apparatus for encoding audio data according to Embodiment 6 of the present disclosure.

Optionally, referring to FIG. 6, the transmitting module 502 includes a first transmitting unit 502*a* configured to: determine whether the noise high-band signal has a preset spectral structure; if yes, and a sending condition of the policy for sending the second SID is satisfied, encode an SID of the noise high-band signal using the policy for encoding the second SID, and send the SID; and if not, determine that the noise high-band signal does not need to be encoded and transmitted.

In this embodiment, the first transmitting unit 502*a* includes a first determining subunit configured to obtain a spectrum of the noise high-band signal, divide the spectrum into at least two sub-bands, and if an average energy of any first sub-band in the sub-bands is not smaller than an average energy of a second sub-band in the sub-bands, where a frequency band in which the second sub-band is located is higher than a frequency band in which the first sub-band is located, determine that the noise high-band signal has no preset spectral structure, otherwise, determine that the noise high-band signal has a preset spectral structure.

Referring to FIG. 6, optionally, the transmitting module 502 includes a second transmitting unit 502*b* configured to generate a deviation according to a first ratio and a second ratio, where the first ratio is a ratio of an energy of the noise high-band signal to an energy of the noise low-band signal of the noise frame, and the second ratio is a ratio of an energy of a noise high-band signal to an energy of a noise low-band signal at a moment when an SID including a noise high-band parameter is sent last time before the noise frame, and determine whether the deviation reaches a preset threshold, if yes, encode an SID of the noise high-band signal using the policy for encoding the second SID, and send the SID, and if not, determine that the noise high-band signal does not need to be encoded and transmitted.

Optionally, that the first ratio is a ratio of an energy of the noise high-band signal to an energy of the noise low-band signal of the noise frame includes that the first ratio is a ratio of an instant energy of the noise high-band signal to an instant energy of the noise low-band signal of the noise frame, and correspondingly, that the second ratio is a ratio of an energy of a noise high-band signal to an energy of a noise low-band signal at a moment when an SID including a noise high-band parameter is sent last time before the noise frame includes that the second ratio is a ratio of an instant energy of the noise high-band signal to an instant energy of the noise low-band signal at the moment when the SID including the noise high-band parameter is sent last time before the noise frame.

Alternatively, that the first ratio is a ratio of an energy of the noise high-band signal to an energy of the noise low-band signal of the noise frame includes that the first ratio is a ratio of a weighted average energy of noise high-band signals of the noise frame and a noise frame prior to the noise frame to a weighted average energy of noise low-band signals of the noise frame and the noise frame prior to the noise frame, and correspondingly, that the second ratio is a ratio of an energy of a noise high-band signal to an energy of a noise low-band signal at a moment when an SID including a noise high-band parameter is sent last time before the noise frame includes that the second ratio is a ratio of a weighted average energy of high-band signals to a weighted average energy of low-band signals of a noise frame and a noise frame prior to the noise frame at the moment when the SID including the noise high-band parameter is sent last time before the noise frame.

Optionally, in this embodiment, the second transmitting unit 502*b* includes a calculating subunit configured to separately calculate a logarithmic value of the first ratio and a logarithmic value of the second ratio, and calculate an absolute value of a difference between the logarithmic value of the first ratio and the logarithmic value of the second ratio, to obtain the deviation.

Referring to FIG. 6, optionally, in this embodiment, the transmitting module 502 includes a third transmitting unit 502*c* configured to determine whether a spectral structure of the noise high-band signal of the noise frame, in comparison with an average spectral structure of noise high-band signals before the noise frame, satisfies a preset condition, if yes, encode an SID of the noise high-band signal of the noise frame using the policy for sending the second SID, and send the SID, and if not, determine that the noise high-band signal of the noise frame does not need to be encoded and transmitted.

In this embodiment, optionally, the average spectral structure of the noise high-band signals before the noise frame includes a weighted average of spectrums of the noise high-band signals before the noise frame.

Optionally, in this embodiment, the sending condition in the policy for sending the second SID of the second discontinuous transmission mechanism further includes the first discontinuous transmission mechanism satisfying a condition for sending the first SID.

The apparatus embodiment provided by the present disclosure brings the following beneficial effects, a current noise frame of an audio signal is obtained, and the current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 7

Figure 7:
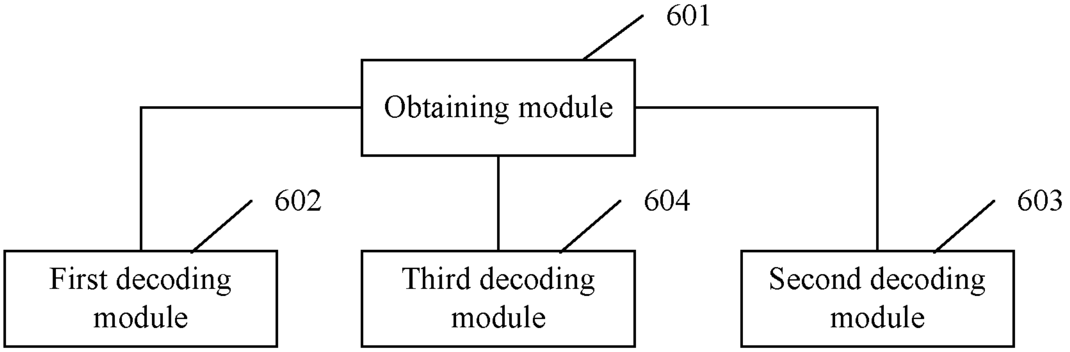
FIG. 7 is a schematic diagram of an apparatus for decoding audio data according to Embodiment 7 of the present disclosure.

Referring to FIG. 7, this embodiment provides an apparatus for decoding audio data, where the apparatus includes an obtaining module 601, a first decoding module 602, a second decoding module 603, and a third decoding module 604.

The obtaining module 601 is configured to determine whether a received current SID includes a low-band parameter or a high-band parameter.

The first decoding module 602 is configured to, if the SID obtained by the obtaining module 601 includes the low-band parameter, decode the SID to obtain a noise low-band parameter, locally generate a noise high-band parameter, and obtain a first CN frame according to the noise low-band parameter obtained by decoding and the locally generated noise high-band parameter.

The second decoding module 603 is configured to, if the SID obtained by the obtaining module 601 includes the high-band parameter, decode the SID to obtain a noise high-band parameter, locally generate a noise low-band parameter, and obtain a second CN frame according to the noise high-band parameter obtained by decoding and the locally generated noise low-band parameter.

The third decoding module 604 is configured to, if the SID obtained by the obtaining module 601 includes the high-band parameter and the low-band parameter, decode the SID to obtain a noise high-band parameter and a noise low-band parameter, and obtain a third CN frame according to the noise high-band parameter and the noise low-band parameter obtained by decoding.

Optionally, in this embodiment, the first decoding module 602 is further configured to, before decoding the SID to obtain a noise low-band parameter, locally generating a noise high-band parameter, and obtaining a first CN frame according to the noise low-band parameter obtained by decoding and the locally generated noise high-band parameter, if the decoder is in a first comfort noise generation CNG state, enter a second CNG state.

Optionally, in this embodiment, the third decoding module 604 is further configured to, before decoding the SID to obtain a noise high-band parameter and a noise low-band parameter, and obtaining a third CN frame according to the noise high-band parameter and the noise low-band parameter obtained by decoding, if the decoder is in a second CNG state, enter a first CNG state.

Optionally, the obtaining module 601 includes a first determining unit configured to, if the number of bits of the SID is smaller than a preset first threshold, determine that the SID includes the high-band parameter, if the number of bits of the SID is greater than a preset first threshold and smaller than a preset second threshold, determine that the SID includes the low-band parameter, and if the number of bits of the SID is greater than a preset second threshold and smaller than a preset third threshold, determine that the SID includes the high-band parameter and the low-band parameter, or a second determining unit configured to, if the SID includes a first identifier, determine that the SID includes the high-band parameter, if the SID includes a second identifier, determine that the SID includes the low-band parameter, and if the SID includes a third identifier, determine that the SID includes the low-band parameter and the high-band parameter.

In this embodiment, the first decoding module 602 includes a first obtaining unit configured to separately obtain a weighted average energy of a noise high-band signal and a synthesis filter coefficient of the noise high-band signal at a moment corresponding to the SID, and a second obtaining unit configured to obtain the noise high-band signal according to the obtained weighted average energy of the noise high-band signal and the obtained synthesis filter coefficient of the noise high-band signal at the moment corresponding to the SID.

Optionally, the first obtaining unit includes a first obtaining subunit configured to obtain an energy of a low-band signal of the first CN frame according to the noise low-band parameter obtained by decoding, a calculating subunit configured to calculate a ratio of an energy of a noise high-band signal to an energy of a noise low-band signal at a moment when an SID including a high-band parameter is received before the SID, to obtain a first ratio, a second obtaining subunit configured to obtain, according to the energy of the low-band signal of the first CN frame and the first ratio, an energy of the noise high-band signal at the moment corresponding to the SID, and a third obtaining subunit configured to perform weighted averaging on the energy of the noise high-band signal at the moment corresponding to the SID and an energy of a high-band signal of a locally buffered CN frame, to obtain the weighted average energy of the noise high-band signal at the moment corresponding to the SID, where the weighted average energy of the noise high-band signal at the moment corresponding to the SID is a high-band signal energy of the first CN frame.

The calculating subunit is configured to calculate a ratio of an instant energy of the noise high-band signal to an instant energy of the noise low-band signal at the moment when the SID including the high-band parameter is received before the SID, to obtain the first ratio, or calculate a ratio of a weighted average energy of the noise high-band signal to a weighted average energy of the noise low-band signal at the moment when the SID including the high-band parameter is received before the SID, to obtain the first ratio.

When the energy of the noise high-band signal at the moment corresponding to the SID is greater than an energy of a high-band signal of a previous CN frame that is locally buffered, the energy of the high-band signal of the previous CN frame that is locally buffered is updated at a first rate, otherwise, the energy of the high-band signal of the previous CN frame that is locally buffered is updated at a second rate, where the first rate is greater than the second rate.

Optionally, the first obtaining unit includes a first selecting subunit configured to select a high-band signal of a speech frame with a minimum high-band signal energy from speech frames within a preset period of time before the SID, and obtain, according to an energy of the high-band signal of the speech frame with the minimum high-band signal energy among the speech frames, the weighted average energy of the noise high-band signal at the moment corresponding to the SID, where the weighted average energy of the noise high-band signal at the moment corresponding to the SID is a high-band signal energy of the first CN frame, or a second selecting subunit configured to select high-band signals of N speech frames with a high-band signal energy smaller than a preset threshold from speech frames within a preset period of time before the SID, and obtain, according to a weighted average energy of the high-band signals of the N speech frames, the weighted average energy of the noise high-band signal at the moment corresponding to the SID, where the weighted average energy of the noise high-band signal at the moment corresponding to the SID is a high-band signal energy of the first CN frame.

Optionally, the first obtaining unit includes a distributing subunit configured to distribute M ISF coefficients or ISP coefficients or LSF coefficients or LSP coefficients in a frequency range corresponding to a high-band signal, a first randomization processing subunit configured to perform randomization processing on the M coefficients, where a feature of the randomization is, causing each coefficient among the M coefficients to gradually approach a target value corresponding to each coefficient, where the target value is a value in a preset range adjacent to a coefficient value, and the target value of each coefficient among the M coefficients changes after every N frames, where both the M and the N are natural numbers, and a fourth obtaining subunit configured to obtain, according to the filter coefficients obtained by randomization processing, the synthesis filter coefficient of the noise high-band signal at the moment corresponding to the SID.

Optionally, the first obtaining unit includes a fifth obtaining subunit configured to obtain M ISF coefficients or ISP coefficients or LSF coefficients or LSP coefficients of a locally buffered noise high-band signal, a second randomization processing subunit configured to perform randomization processing on the M coefficients, where a feature of the randomization is causing each coefficient among the M coefficients to gradually approach a target value corresponding to each coefficient, where the target value is a value in a preset range adjacent to a coefficient value, and the target value of each coefficient among the M coefficients changes after every N frames, and a sixth obtaining subunit configured to obtain, according to the filter coefficients obtained by randomization processing, the synthesis filter coefficient of the noise high-band signal at the moment corresponding to the SID.

Figure 8:
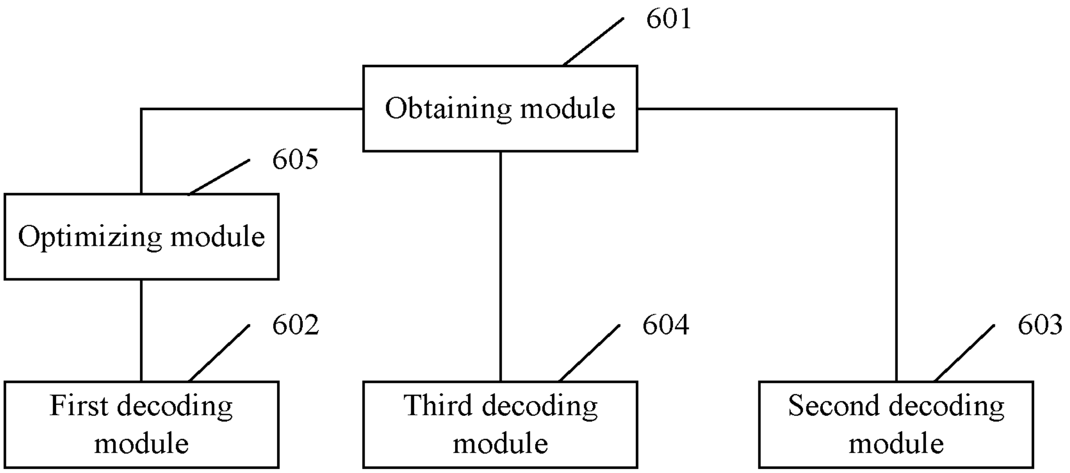
FIG. 8 is a schematic diagram of another apparatus for decoding audio data according to Embodiment 7 of the present disclosure.

Referring to FIG. 8, optionally, the apparatus further includes an optimizing module 605 configured to, before the first decoding module 602 obtains the first CN frame, when history frames adjacent to the SID are encoded speech frames, if an average energy of high-band signals or a part of high-band signals that are decoded from the encoded speech frames is smaller than an average energy of noise high-band signals or a part of the noise high-band signals that are generated locally, multiply noise high-band signals of subsequent L frames starting from the SID by a smoothing factor smaller than 1, to obtain a new weighted average energy of the locally generated noise high-band signals.

Correspondingly, the first decoding module 602 is configured to obtain a fourth CN frame according to the noise low-band parameter obtained by decoding, the synthesis filter coefficient of the noise high-band signal at the moment corresponding to the SID, and the new weighted average energy of the locally generated noise high-band signals.

The apparatus embodiment provided by the present disclosure brings the following beneficial effects, a decoder obtains an SID, and determines whether the SID includes a low-band parameter or a high-band parameter, if the SID includes the low-band parameter, decodes the SID to obtain a noise low-band parameter, locally generates a noise high-band parameter, and obtains a first CN frame according to the noise low-band parameter obtained by decoding and the locally generated noise high-band parameter, if the SID includes the high-band parameter, decodes the SID to obtain a noise high-band parameter, locally generates a noise low-band parameter, and obtains a second CN frame according to the noise high-band parameter obtained by decoding and the locally generated noise low-band parameter, and if the SID includes the high-band parameter and the low-band parameter, decodes the SID to obtain a noise high-band parameter and a noise low-band parameter, and obtains a third CN frame according to the noise high-band parameter and the noise low-band parameter obtained by decoding. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

Embodiment 8

Figure 9:
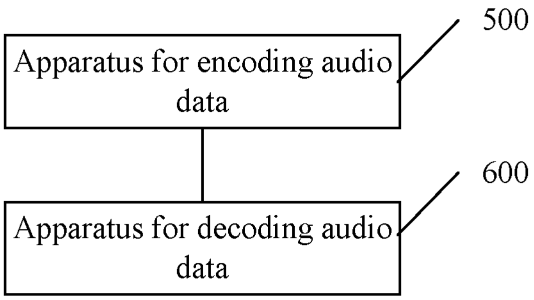
FIG. 9 is a schematic diagram of a system for processing audio data according to Embodiment 8 of the present disclosure.

Referring to FIG. 9, this embodiment provides a system for processing audio data, where the system includes the foregoing apparatus for encoding audio data and the foregoing apparatus for decoding audio data.

The technical solutions provided by the embodiments of the present disclosure bring the following beneficial effects, a current noise frame of an audio signal is obtained, and the current noise frame is decomposed into a noise low-band signal and a noise high-band signal, then the noise low-band signal is encoded and transmitted using a first discontinuous transmission mechanism, and the noise high-band signal is encoded and transmitted using a second discontinuous transmission mechanism. A decoder obtains an SID, and determines whether the SID includes a low-band parameter and/or a high-band parameter, if the SID includes the low-band parameter, decodes the SID to obtain a noise low-band parameter, locally generates a noise high-band parameter, and obtains a first CN frame according to the noise low-band parameter obtained by decoding and the locally generated noise high-band parameter, if the SID includes the high-band parameter, decodes the SID to obtain a noise high-band parameter, locally generates a noise low-band parameter, and obtains a second CN frame according to the noise high-band parameter obtained by decoding and the locally generated noise low-band parameter, and if the SID includes the high-band parameter and the low-band parameter, decodes the SID to obtain a noise high-band parameter and a noise low-band parameter, and obtains a third CN frame according to the noise high-band parameter and the noise low-band parameter obtained by decoding. In this way, different processing manners are used for the high-band signal and the low-band signal, calculation complexity may be reduced and encoded bits may be saved under a premise of not lowering subjective quality of a codec, and bits that are saved help to achieve an objective of reducing a transmission bandwidth or improving overall encoding quality, thereby solving a super-wideband encoding and transmission problem.

The apparatus and system provided by the embodiments may belong to the same idea as the method embodiments. The specific implementation process of the apparatus and system has been described in detail in the method embodiments and details are not repeatedly described herein.

The method and apparatus for processing audio data in the foregoing embodiments may be applied to an audio encoder or an audio decoder. Audio codecs may be widely applied to various electronic devices, such as a mobile phone, a wireless apparatus, a personal data assistant (PDA), a handheld or portable computer, a global positioning system (GPS) receiver or navigation device, a camera, an audio/video player, a camcorder, a video recorder, and a surveillance device. Generally, such an electronic device includes an audio encoder or an audio decoder. The audio encoder or decoder may be directly implemented using a digital circuit or chip, for example, a digital signal processor (DSP), or implemented using software code to drive a processor to execute a procedure in the software code.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An audio signal encoding method for discontinuous transmission system (DTX) and comprising:

obtaining a first noise frame of an audio signal, wherein the first noise frame includes a first low-band signal and a first high-band signal;

obtaining a first low-band parameter corresponding to the first low-band signal;

obtaining a first high-band parameter corresponding to the first high-band signal;

encoding a first super wideband silence insertion descriptor (SID) frame corresponding to the first noise frame to comprise the first low-band parameter and the first high-band parameter;

obtaining a second noise frame of the audio signal, wherein the second noise frame includes a second low-band signal and a second high-band signal, and wherein the first noise frame is prior to the second noise frame in the audio signal;

obtaining a second low-band parameter corresponding to the second low-band signal;

determining a SID frame type of a second SID frame corresponding to the second noise frame according to a first log-domain energy of the first low-band signal, a second log-domain energy of the first high-band signal, a third log-domain energy of the second low-band signal, and a fourth log-domain energy of the second high-band signal, wherein the SID frame type is either a super wideband SID frame or a wideband SID frame, wherein the wideband SID frame comprises the second low-band parameter, wherein the super wideband SID frame comprises the second low-band parameter and a second high-band parameter corresponding to the second high-band signal; and encoding the second SID frame based on the SID frame type.

2. The audio signal encoding method of claim 1, wherein the third log-domain energy is represented by a third log-domain smoothed average energy of the second low-band signal, wherein the fourth log-domain energy of is represented by a fourth log-domain smoothed average energy of the second high-band signal, wherein the first log-domain energy is represented by a first log-domain smoothed average energy of the first low-band signal, and wherein the second log-domain energy is represented by a second log-domain smoothed average energy of the first high-band signal.

3. The audio signal encoding method of claim 2, further comprising:

obtaining the third log-domain smoothed average energy according to the first log-domain smoothed average energy and a first log-domain average energy of the second low-band signal; and obtaining the fourth log-domain smoothed average energy according to the first log-domain smoothed average energy and a second log-domain average energy of the second high-band signal.

4. The audio signal encoding method of claim 1, wherein determining whether the second SID comprises the second high-band parameter comprises:

obtaining a first difference between the third log-domain energy and the fourth log-domain energy;

obtaining a second difference between the first log-domain energy and the second log-domain energy;

obtaining a third difference between the first difference and the second difference;

comparing an absolute value of the third difference with a preset threshold; and determining the second SID comprises the second low-band parameter and the second high-band parameter when the absolute value of the third difference is greater than the preset threshold.

5. The audio signal encoding method of claim 1, wherein determining whether the second SID comprises the second high-band parameter comprises:

obtaining a first difference between the third log-domain energy and the fourth log-domain energy;

obtaining a second difference between the first log-domain energy and the second log-domain energy;

obtaining a third difference between the first difference and the second difference;

comparing an absolute value of the third difference with a preset threshold; and determining the second SID comprises the second low-band parameter and excludes the second high-band parameter when the absolute value of the third difference is less than or equal to the preset threshold.

6. The audio signal encoding method of claim 1, wherein the second SID comprises the second low-band parameter and the second high-band parameter.

7. The audio signal encoding method of claim 1, wherein the second SID comprises the second low-band parameter and excludes the second high-band parameter.

8. An audio signal encoder for discontinuous transmission system (DTX) and comprising:

a non-transitory memory configured to store computer-executable instructions; and a processor operatively coupled to the non-transitory memory and configured to execute the computer-executable instructions to cause the audio signal encoder to:

obtain a first noise frame of an audio signal, wherein the first noise frame includes a first low-band signal and a first high-band signal;

obtain a first low-band parameter corresponding to the first low-band signal;

obtain a first high-band parameter corresponding to the first high-band signal;

encode a first super wideband silence insertion descriptor (SID) frame corresponding to the first noise frame to comprise the first low-band parameter and the first high-band parameter;

obtain a second noise frame of the audio signal, wherein the second noise frame includes a second low-band signal and a second high-band signal, where the first noise frame is prior to the second noise frame in the audio signal;

obtain a second low-band parameter corresponding to the second low-band signal;

determine a SID frame type of a second SID frame corresponding to the second noise frame according to a first log-domain energy of the first low-band signal, a second log-domain energy of the first high-band signal, a third log-domain energy of the second low-band signal, and a fourth log-domain energy of the second high-band signal, wherein the SID frame type is either a super wideband SID frame or a wideband SID frame, wherein the wideband SID frame comprises the second low-band parameter, and wherein the super wideband SID frame comprises the second low-band parameter and a second high-band parameter corresponding to the second high-band signal; and encode the second SID frame based on the SID frame type.

9. The audio signal encoder of claim 8, wherein the third log-domain energy is represented by a third log-domain smoothed average energy of the second low-band signal, wherein the fourth log-domain energy is represented by a fourth log-domain smoothed average energy of the second high-band signal, wherein the first log-domain energy is represented by a first log-domain smoothed average energy of the first low-band signal, and wherein the second log-domain energy is represented by a second log-domain smoothed average energy of the first high-band signal.

10. The audio signal encoder of claim 9, wherein the processor is further configured to execute the computer-executable instructions to cause the audio signal encoder to:

obtain the third log-domain smoothed average energy according to the first log-domain smoothed average energy and a first log-domain average energy of the second low-band signal; and obtain the fourth log-domain smoothed average energy according to the first log-domain smoothed average energy and a second log-domain average energy of the second high-band signal.

11. The audio signal encoder of claim 8, wherein the processor is further configured to execute the computer-executable instructions to cause the audio signal encoder to:

obtain a first difference between the third log-domain energy and the fourth log-domain energy;

obtain a second difference between the first log-domain energy and the second log-domain energy;

obtain a third difference between the first difference and the second difference;

compare an absolute value of the third difference with a preset threshold; and determine the second SID comprises the second low-band parameter and the second high-band parameter when the absolute value of the third difference is greater than the preset threshold.

12. The audio signal encoder of claim 8, wherein the processor is further configured to execute the computer-executable instructions to further cause the processor to be configured to:

obtain a first difference between the third log-domain energy and the fourth log-domain;

obtain a second difference between the first log-domain energy and the second log-domain energy;

obtain a third difference between the first difference and the second difference;

compare an absolute value of the third difference with a preset threshold; and determine the second SID comprises the second low-band parameter and excludes the second high-band parameter when the absolute value of the third difference is less than or equal to the preset threshold.

13. The audio signal encoder of claim 8, wherein the second SID comprises the second low-band parameter and the second high-band parameter.

14. The audio signal encoder of claim 8, wherein the second SID comprises the second low-band parameter and excludes the second high-band parameter.

15. A computer program product comprising computer-executable instructions stored on a non-transitory computer-readable medium and that, when executed by a processor, cause an audio signal encoder apparatus to:

obtain a first noise frame of an audio signal, wherein the first noise frame includes a first low-band signal and a first high-band signal;

obtain a first low-band parameter corresponding to the first low-band signal;

obtain a first high-band parameter corresponding to the first high-band signal;

encode a first super wideband silence insertion descriptor (SID) frame corresponding to the first noise frame to comprise the first low-band parameter and the first high-band parameter;

obtain a second noise frame of the audio signal, wherein the second noise frame includes a second low-band signal and a second high-band signal, where the first noise frame is prior to the second noise frame in the audio signal;

obtain a second low-band parameter corresponding to the second low-band signal;

determine a SID frame type of a second SID frame corresponding to the second noise frame according to a first log-domain energy of the first low-band signal, a second log-domain energy of the first high-band signal, a third log-domain energy of the second low-band signal, and a fourth log-domain energy of the second high-band signal, wherein the SID frame type is either a super wideband SID frame or a wideband SID frame, wherein the wideband SID frame comprises the second low-band parameter, and wherein the super wideband SID frame comprises the second low-band parameter and a second high-band parameter corresponding to the second high-band signal; and encode the second SID frame based on the SID frame type.

16. The computer program product of claim 15, wherein the third log-domain energy is represented by a third log-domain smoothed average energy of the second low-band signal, wherein the fourth log-domain energy is represented by a fourth log-domain smoothed average energy of the second high-band signal, wherein the first log-domain energy is represented by a first log-domain smoothed average energy of the first low-band signal, and wherein the second log-domain energy is represented by a second log-domain smoothed average energy of the first high-band signal.

17. The computer program product of claim 16, wherein the computer-executable instructions that when executed by the processor further cause the audio signal encoder apparatus to:

obtain the third log-domain smoothed average energy according to the first log-domain smoothed average energy and a first log-domain average energy of the second low-band signal; and obtain the fourth log-domain smoothed average energy according to the first log-domain smoothed average energy and a second log-domain average energy of the second high-band signal.

18. The computer program product of claim 15, wherein determining whether the second SID comprises the second high-band parameter, the computer-executable instructions that when executed by the processor further cause the audio signal encoder apparatus to:

obtain a first difference between the third log-domain energy and the fourth log-domain energy;

obtain a second difference between the first log-domain energy and the second log-domain energy;

obtain a third difference between the first difference and the second difference;

compare an absolute value of the third difference with a preset threshold;

determine the second SID comprises the second low-band parameter and the second high-band parameter when the absolute value of the third difference is greater than the preset threshold; and determine the second SID comprises the second low-band parameter and excludes the second high-band parameter when the absolute value of the third difference is less than or equal to the preset threshold.

19. The computer program product of claim 15, wherein the second SID comprises the second low-band parameter and the second high-band parameter.

20. The computer program product of claim 15, wherein the second SID comprises the second low-band parameter and excludes the second high-band parameter.

* * * * *